United States Patent
Breslawski et al.

(10) Patent No.: US 7,130,088 B2
(45) Date of Patent: Oct. 31, 2006

(54) RETRACTABLE LAMP FOR AN IMPROVED DOCUMENT SCANNER PAPER PATH

(75) Inventors: Robert S. Breslawski, Rochester, NY (US); Robert M. Westcott, Holley, NY (US); Stephen A. Horstman, Rochester, NY (US); Charles E. Brugger, Rochester, NY (US)

(73) Assignee: Kodak Company, Rochester, NY (US)

( * ) Notice: Subject to any disclaimer, the term of this patent is extended or adjusted under 35 U.S.C. 154(b) by 1098 days.

(21) Appl. No.: 10/136,502

(22) Filed: May 1, 2002

(65) Prior Publication Data
US 2003/0206318 A1    Nov. 6, 2003

(51) Int. Cl.
H04N 1/04 (2006.01)
H01L 27/00 (2006.01)

(52) U.S. Cl. ............... 358/474; 358/498; 358/487; 250/208.1

(58) Field of Classification Search .......... 358/474, 358/498, 487, 496; 250/208.1
See application file for complete search history.

(56) References Cited

U.S. PATENT DOCUMENTS 7,031,032 B1 * 4/2006 Westcott et al. ............ 358/474

FOREIGN PATENT DOCUMENTS

JP         63110438 A  *  5/1988

* cited by examiner

Primary Examiner—Thomas D. Lee
Assistant Examiner—Heather D Gibbs
(74) Attorney, Agent, or Firm—Nelson Adrian Blish

(57) ABSTRACT

A combination platen and sheet fed scanner has a retractable lamp which comprises a sheet fed scanning unit (1). A sheet feeding mechanism is in the sheet fed scanning unit (1). A first camera images a first side of a document fed through the sheet feeding mechanism. A second camera images a side of the document. A platen (2) is detachably mounted to the sheet fed scanning unit (1). A mechanism moves the second camera from the sheet fed scanning unit (1) to the platen (2). A lamp is associated with the second camera, the lamp is retractably mounted to the second camera.

21 Claims, 33 Drawing Sheets

RETRACTABLE LAMP FOR AN IMPROVED DOCUMENT SCANNER PAPER PATH

CROSS REFERENCE TO RELATED APPLICATIONS

Reference is made to commonly-assigned copending U.S. patent application Ser. No. 09/618,739, filed Jul. 18, 2000, entitled DOCUMENT SCANNING SYSTEM WITH DOCKABLE PLATEN FLATBED PROVIDING SHEET FED AND PLATEN SCANNING FUNCTIONS, by Westcott et al.; U.S. patent application Ser. No. 10/028,133, filed Dec. 20, 2001, entitled DOCUMENT SCANNING SYSTEM WITH TETHERED PLATEN ELEMENT PROVIDING SHEET-FED AND PLATEN SCANNING FUNCTIONS, by Brugger et al., the disclosures of which are incorporated herein.

FIELD OF THE INVENTION

This invention is related generally to a modular document scanning system and particularly to a modular scanner supporting both sheet fed and platen scanning of documents. More particularly, the invention relates to a modular scanning system with a detachable platen element for single sheet scanning.

BACKGROUND OF THE INVENTION

Document scanners have become a popular computing accessory both in the home and the office. Document scanners (or simply "scanners") come in three distinct varieties: sheet fed scanners, platen scanners, and combination sheet fed with platen capability scanners. With respect to sheet fed scanners, an image forming subsystem, such as a camera, typically a charged couple device (CCD) and a lens in combination with an illumination source, scans an image by moving a sheet of paper past the camera, which sits in a stationary position. Individual raster lines are imaged by the camera and then pieced together to create a two-dimensional (2D) image representation of the original document. The camera is basically looking at one sliver of the document many times as the document is moved across a lens. The paper motion supplies one dimension of the document image, while the width is supplied by the camera. The in-paper travel direction and the width of the document is determined by the optics magnification and the dimensions of the CCD within the image forming subsystem.

In some cases, the shape of the sheet fed scanners paper path is semi-circular. For example, some scanners have a semi-circular paper path wherein sheets can be fed from a tray on top and exit beneath, or vice versa. In other cases, the paper path is "straight through."

In a platen scanner, a document is placed face down onto a stationary flat, glass surface of the scanning unit and the image forming subsystem (camera and illumination source) moves underneath the fixed document to perform the scanning operation. In this case, the camera's motion provides the length, of the scanned image, while the camera's optics provides the width.

Production scanners, also known as combination scanners, vary in speed, function, and cost and are often used by businesses for scanning large quantities of documents. For example, scans of several hundred (100) to several hundred thousand (100,000) pages per job are typical for "production" scanners. One type of production scanner combines the functionality of a sheet fed scanner with that of a platen scanner. Combination production scanners feed multiple sheets from a stack past a stationary camera, thus eliminating the need for lifting a lid and placing document sheets face down one at a time. The platen capability is employed to deal with documents that do not feed reliably from a stack. Production scanners of this type are manufactured as a single unit combining the platen scanning functions with the sheet moving functions.

In one common configuration, a dual camera image forming subsystem is used with a paper path extending between the cameras and the scanner is adapted to operate in two distinct scanning modes. In a sheet fed or straight-through scanning mode, documents are fed from a stack and between the cameras so that they are imaged on both the top and bottom during the same scanning operation. In a platen scanning mode, one of the cameras can be made to mimic the functionality of a platen scanner by placing a platen element adjacent to it and moving the camera beneath a stationary document placed on the platen. In this way, one of the "stationary" cameras is also used as part of a platen image forming subsystem as a "moving camera." Such combination production scanners are often known as platen scanners with auto feed capability. This class of scanning devices utilizes a small paper path in combination with a camera that operates in both a parked position for auto-feed with movement of a document for sheet fed scanning, and mobile operation for a stationary document during platen scanning.

Prior art sheet fed, platen, or combination scanners, have some limitations. For those customers whose primary need is for a sheet fed scanner but who occasionally need the platen utility, they must purchase a combination device or two separate scanners, one sheet fed and one platen. Purchasing both types of scanning devices may be cost prohibitive or impossible and, in either case, impractical for applications where portability is desired. For example, service bureaus require the ability to pick up the scanner and host computer, which is attached to the scanner, in order to transport both systems to the jobsite. After the job is finished, the scanner and computer must be brought back to the service bureau headquarters or to the next jobsite. Thus, portability and the ability to reconfigure and perform multiple scanning functions are critical to people who buy scanners to scan documents as a service.

Other limitations of the prior art scanners are the relatively high cost and large size of the footprint associated with the combination production scanners that combine platen and sheet feeding functions in one unit. That is, they take up significant room on a desktop. Since the footprint is large, the cost of manufacture is greater than a single function scanning device.

Typically, such combination production scanners only come in one of various classes suitable for scanning a single size or style of document. For example, the platen portion of the combination scanner can be equipped to handle 8½×11 inch or European sized documents (also known as A4) or they can be equipped to handle 11 by 17 inch documents (also known as A3). Thus, the prior art combination production scanners may not be configured to scan the size of documents that the customer desires have scanned. A relatively low cost scanning device that can handle various paper sizes in a unit having a relative small footprint, and which combines the functionality of a platen scanner with that of a sheet fed scanner would provide numerous advantages.

A problem with bottom fed sheet combination scanners, is that these paper paths include one fairly sharp angled bend.

FIG. 1 depicts a typical paper path, camera and platen arrangement of the prior art. This bend is necessary in order to allow room for the lower camera 24 and it's illumination source to move out from underneath the paper path rollers 13, 14 that are located upstream of the stationary (sheet fed) scanning aperture. This occurs when the CCD camera is moved into the platen imaging portion whereby the paper is stationary and the lower camera 24 moves under the paper to form the image.

Normally, the illumination source must be located very close to the (sheet fed) scanning aperture plane. This is done in order to minimize the distance from the illumination source, or lamp, to the sheet being imaged and thereby optimize the amount of reflected light as seen by the camera. Since the camera must have the same focal position in both the stationary (sheet fed) position and the moving (platen scan position), this means that the plane at which the document passes by the camera and the plane of the platen glass are the same. Since rollers of some diameter (usually on the order of 0.750" to 1.00") are employed to move the sheet through the sheet fed portion of the scanner, this means that the entry point of the sheet must be greater than this diameter above the plane of the platen and/or stationary aperture. In the prior art, this is accomplished by angling the paper path downward toward the plane of the stationary aperture and then forcing the sheet to turn sharply just prior to reaching the plane of the aperture. This angle and elevation change in the paper path allows for sufficient clearance for the illumination source and the image forming device (camera) to move under these rollers and out into the platen. Normally, the platen camera moves along a rod that positions it relative to both the stationary and platen so that the illumination source clears the aperture glass planes.

This sharp bend in the paper path 62, leads to a reduced range of paper thickness and stiffness that can be fed reliably by the sheet fed transport. The bend may also impart imaging artifacts. For very stiff or very thick sheets, this turn is too sharp and can cause paper damage and/or stalling due to stubbing and/or drag forces that are too high. Image artifacts can occur as a result of sheet deformation that comes as result of the sharp bend. In addition, motion anomalies can show up as image artifacts due to momentary changes in velocity that are found as the sheet goes through the angle transitions. It is therefore desirable to provide a combination scanner with a detachable platen wherein the paper path for the sheet fed portion is not forced through a sharp bend during sheet fed scanning.

SUMMARY OF THE INVENTION

The present invention provides a modular scanner with a detachable platen that includes an improved paper path configuration utilizing a retractable illumination source in conjunction with a substantially flatter paper path than that found in the current art of combination sheet fed and platen scanners. The improved paper path is accomplished by creating a straighter less abrupt path by configuring an illumination source to be retractable.

Briefly, according to one aspect of the present invention a combination platen and sheet fed scanner has a retractable lamp which comprises a sheet fed scanning unit. A sheet feeding mechanism is in the sheet fed scanning unit. A first camera images a first side of a document fed through the sheet feeding mechanism. A second camera images a side of the document. A platen is detachably mounted to the sheet fed scanning unit. A mechanism moves the second camera from the sheet fed scanning unit to the platen. A lamp is associated with the second camera, the lamp is retractably mounted to the second camera.

In one embodiment, the sheet fed or base scanning unit is comprised of an input tray for accepting a stack of documents, a feeding mechanism for feeding said documents, a paper path with drive and idler rollers for transporting said documents, an upper camera and upper illumination source for imaging the upper or back side of said documents and a lower camera for imaging the lower or front side of documents fed face down from the input tray. The elements of the first scanning unit are assembled in a housing or base structure. The housing of the first scanning unit contains an opening that allows the lower camera and illumination source to be used as an imager in a platen scanning mode when a second housing for accomplishing this platen functionality is attached or docked at the opening.

The present invention provides for configuring the paper path in a substantially flat or straight arrangement. This is enabled and accomplished by mounting the illumination source in a manner that allows it to retract below certain paper path rollers as it moves from it's stationary position for sheet fed imaging to it's transversing platen scanning motion.

BRIEF DESCRIPTION OF THE DRAWINGS

For a better understanding of the invention, reference is made to the following detailed description taken in conjunction with the appended drawings in which.

Corresponding numerals and references in the detailed description correspond to like parts in the figures unless otherwise indicated.

DETAILED DESCRIPTION OF THE INVENTION

Figure 1:
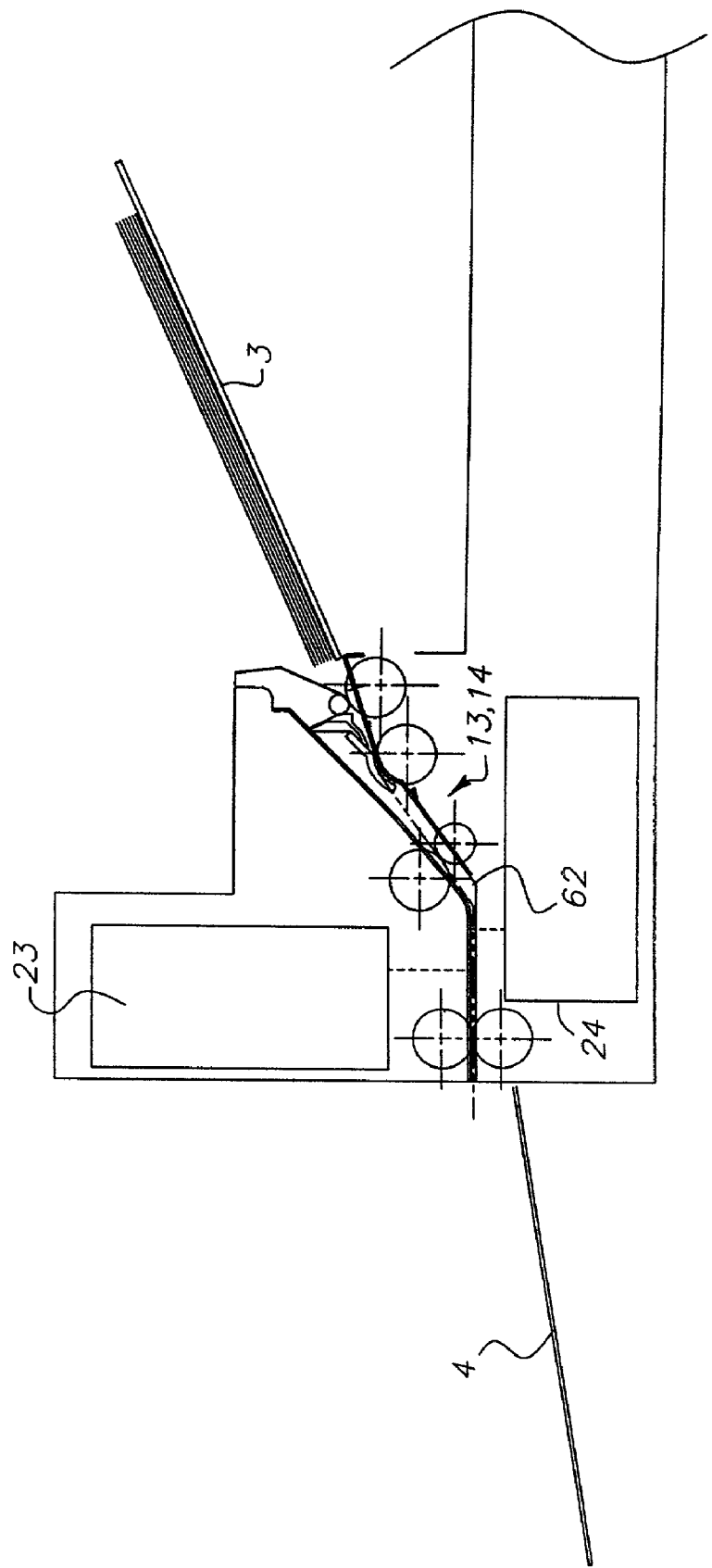
FIG. 1 illustrates a prior art combination sheet fed and platen scanner utilizing an illumination source that is non-retractable and a paper path with at least one sharp turn or bend.
Figure 2:
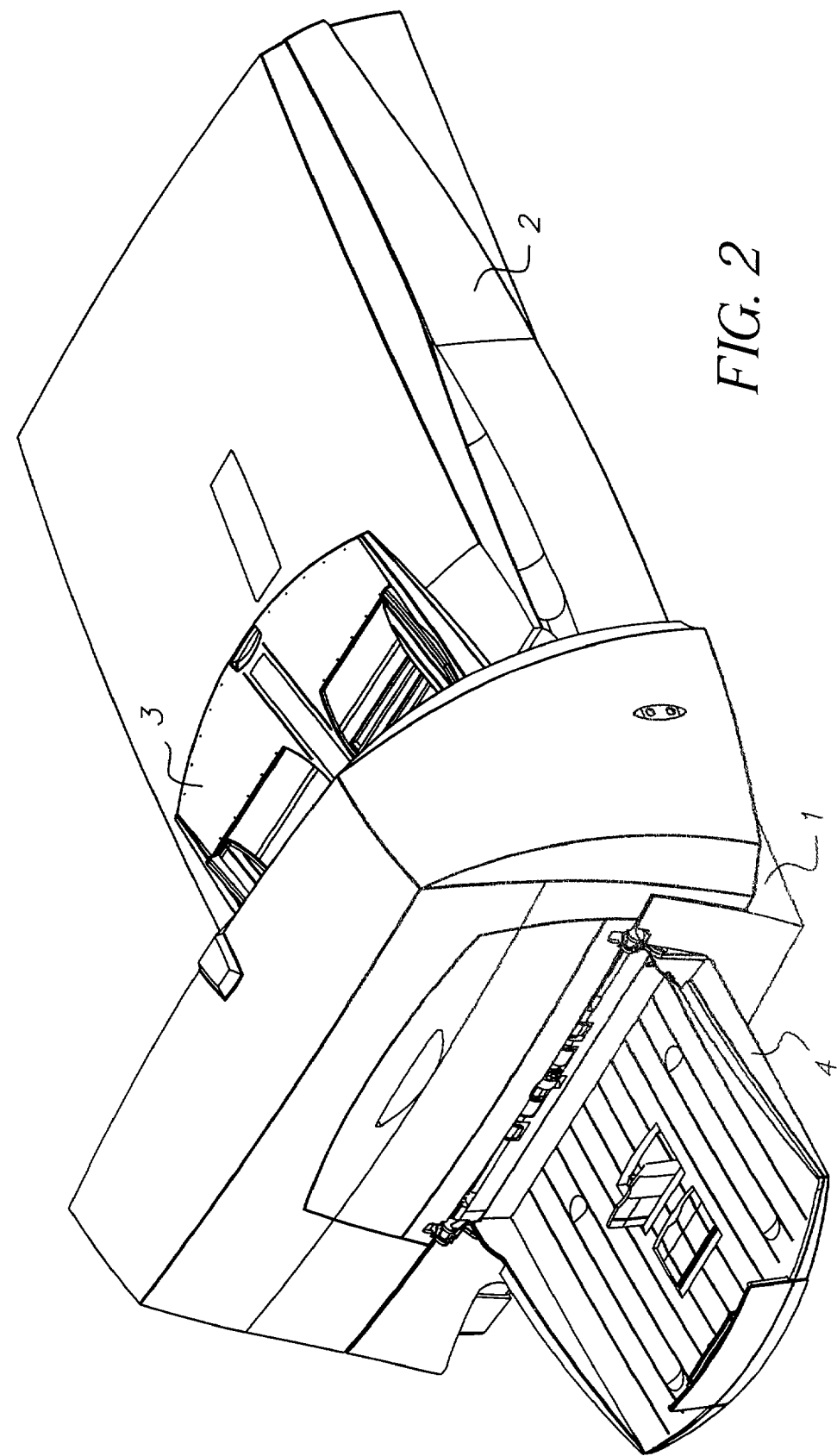
FIGS. 2 and 5 is a perspective view of a combination scanner according to the present invention showing the sheet fed scanner portion with the detachable platen unit docked or attached.
Figure 3:
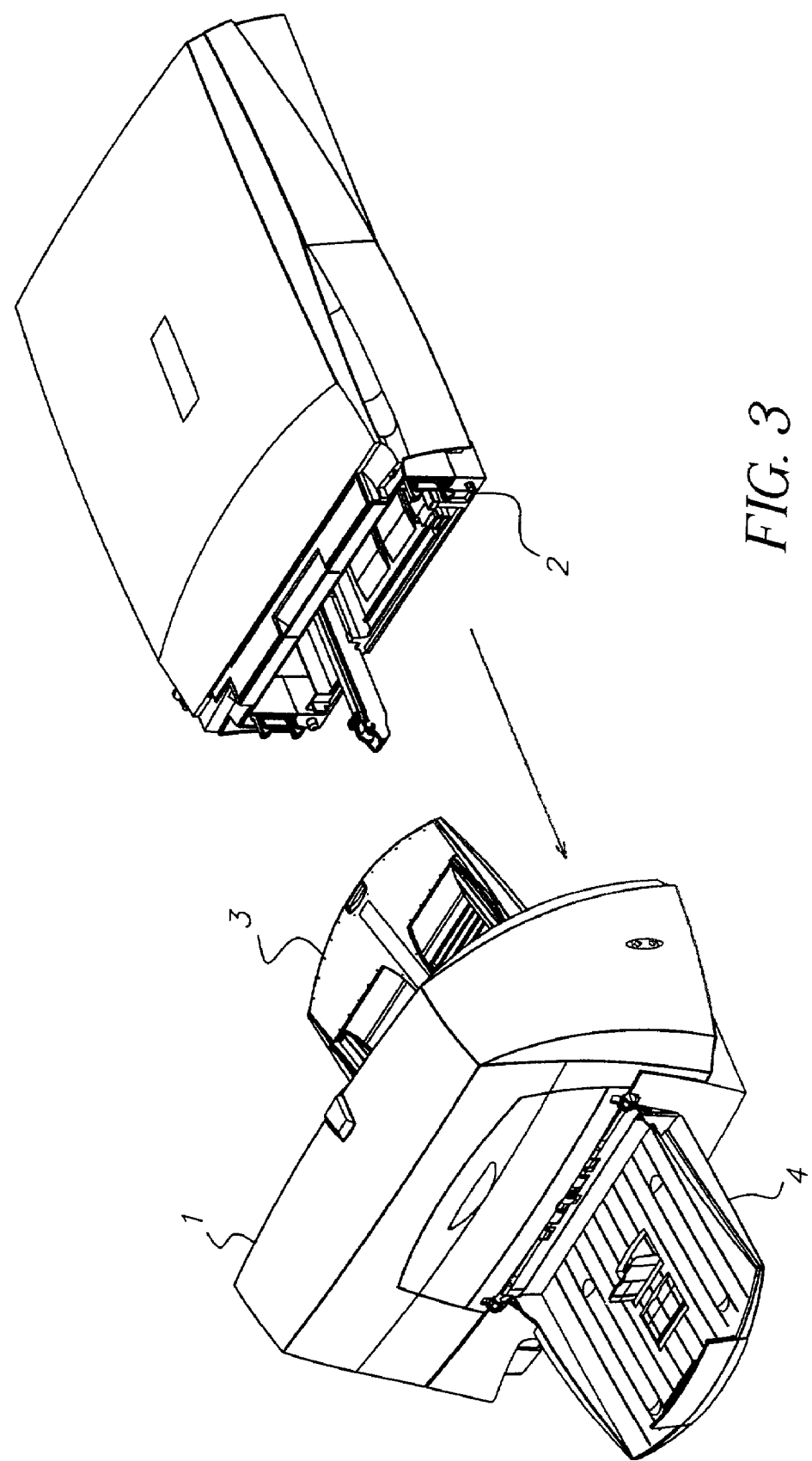
FIGS. 3 and 4 is a perspective view of a combination scanner according to the present invention showing the sheet fed scanner with the platen portion detached.
Figure 4:
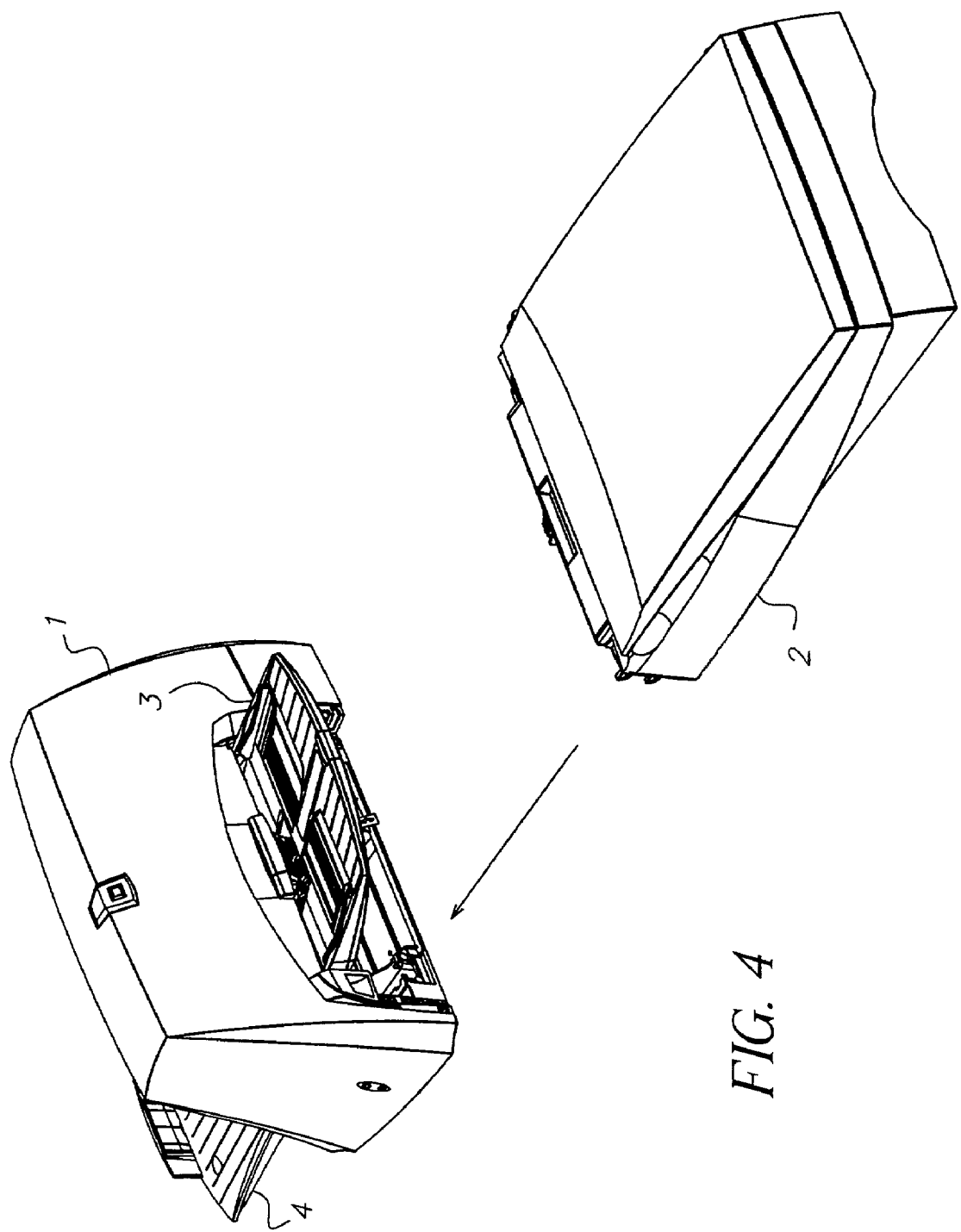

In one embodiment a modular scanner according to the present invention comprises a sheet fed scanning unit and a detachable platen unit. FIGS. 2–5 show perspective views of the sheet fed scanner with the detachable platen unit. FIGS. 3 and 4 show the platen unit detached.

The present invention provides a modular scanner or scanning system with a detachable platen unit 2 for single sheet or multiple document scanning, which allows for both sheet fed and platen scanning of documents. The platen unit 2 attaches or docks to a "straight-through" or sheet fed transport scanning unit 1 that includes a portion of the mechanisms necessary for platen scanning. The upper and lower paper path portions 11, 12, shown in FIGS. 6–9, are configured in a substantially flat or straight arrangement and a lower illumination source or lamp 22 is retractably mounted to a lower camera 24. This retractable mounting thereby enabling the lamp to clear drive rollers 13 of the paper transport while providing the motion necessary to accomplish the platen scanning function.

Figure 8:
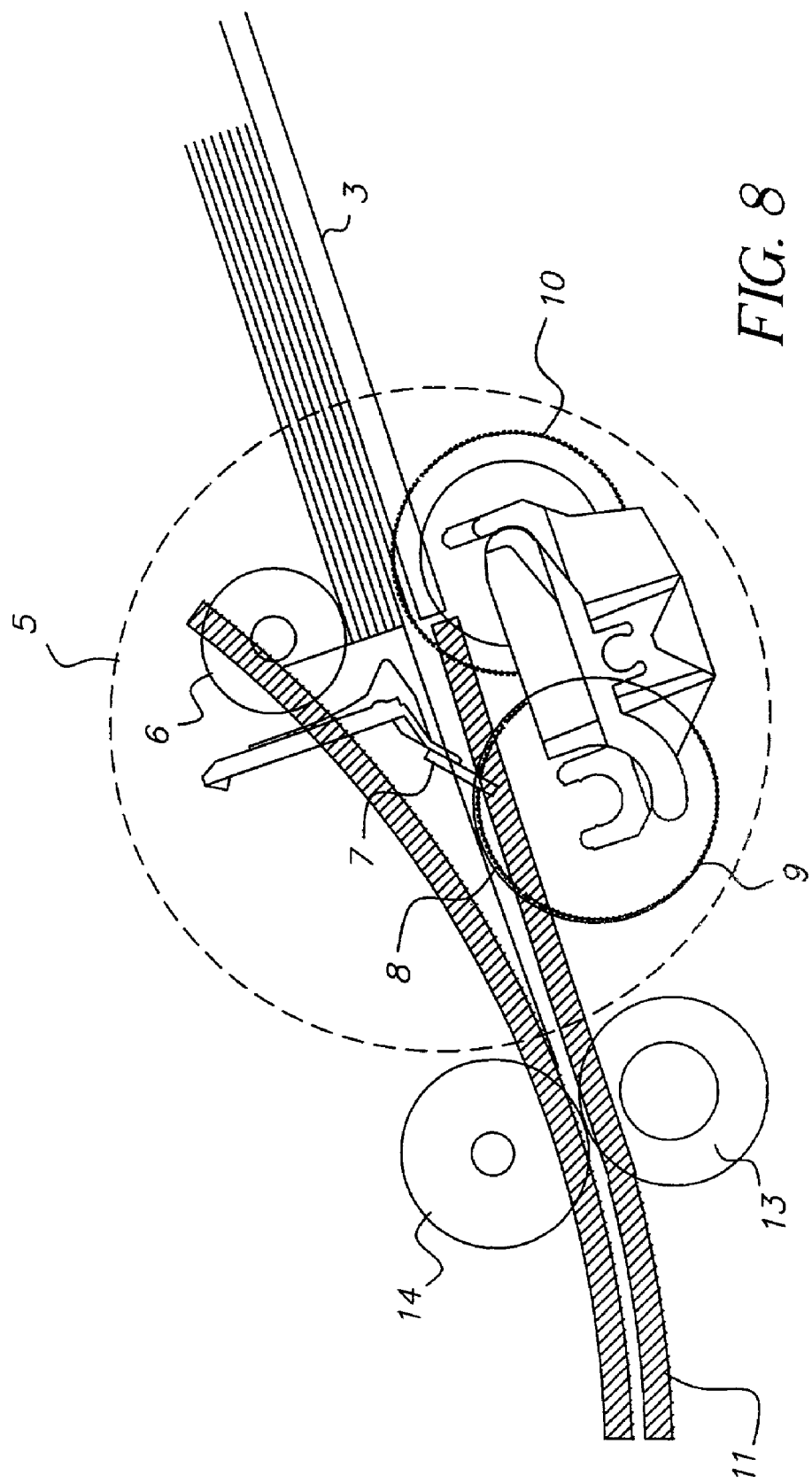
FIG. 8 is a detailed view of the auto feeder portion of the sheet fed scanner paper transport.

In the sheet fed transport scanning unit 1, sheets are fed into a paper path with the use of an auto feeder mechanism 5. The auto feeder consists of a stack support or input tray 3, an urging or picker roller 10, a pressure roller, 6 a feed roller 9, a pre-separation pad 7, and a separation roller 8. When commanded to feed, the scanner's auto feeder 5 advances sheets from a stack placed on the stack support 3 into the scanners paper path. The functions of the urging or picker roller 10, separation roller 8, and pre-separation pad 7 are commonly found within the art of friction feeding devices as they serve to singularly advance the intended sheet to be imaged into the transport and hold back or retard any subsequent non-intended sheets. The stack support 3 can be referred to as an entrance, supply, or input tray. A side view of the auto feeder 5 is shown in FIG. 8.

The paper path consists of an upper and lower portion 11, 12. The lower paper path portion 12 contains drive rollers 13 which move the sheets. The upper paper path portion 11 housing idler or normal force rollers 14 provide the necessary contact forces for the drive rollers. The drive rollers 13 are in turn driven through a series of timing belts 15 which are connected through a pulley arrangement to a drive motor 16, shown in FIG. 7.

Figure 9:
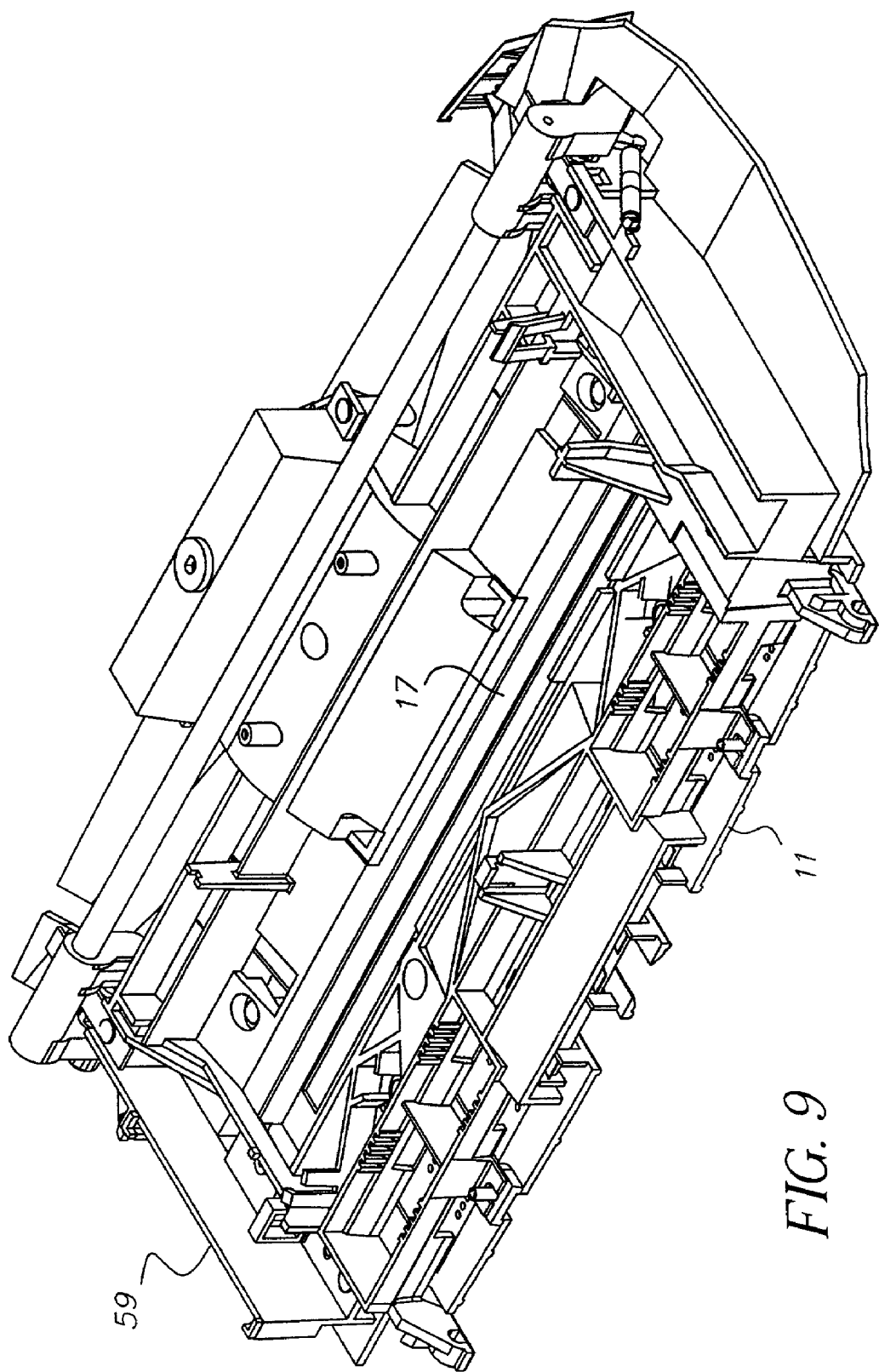
FIGS. 9–11 are the upper paper path portion of the sheet fed scanner with a view of the upper camera attached.
Figure 10:
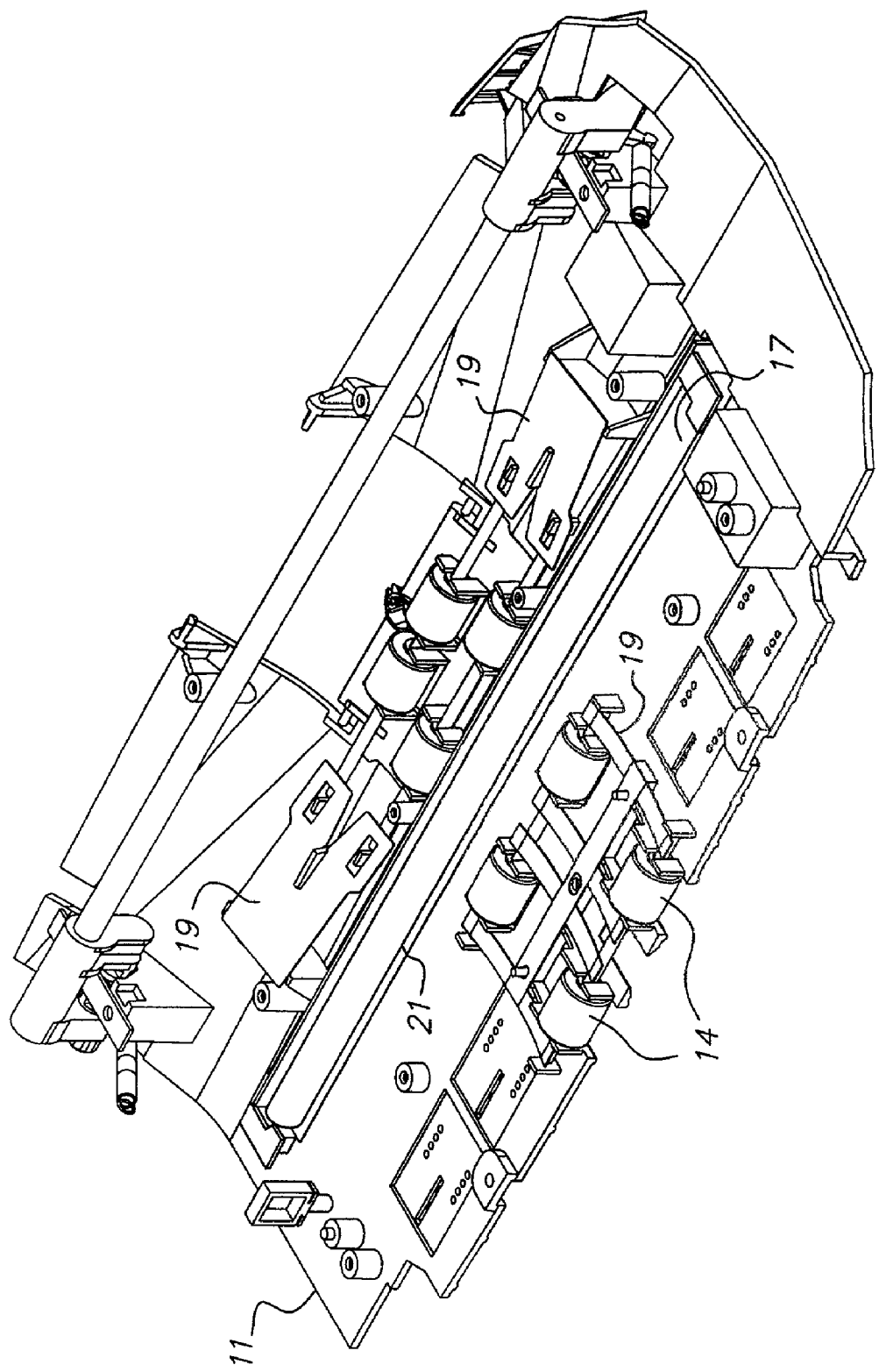
Figure 11:
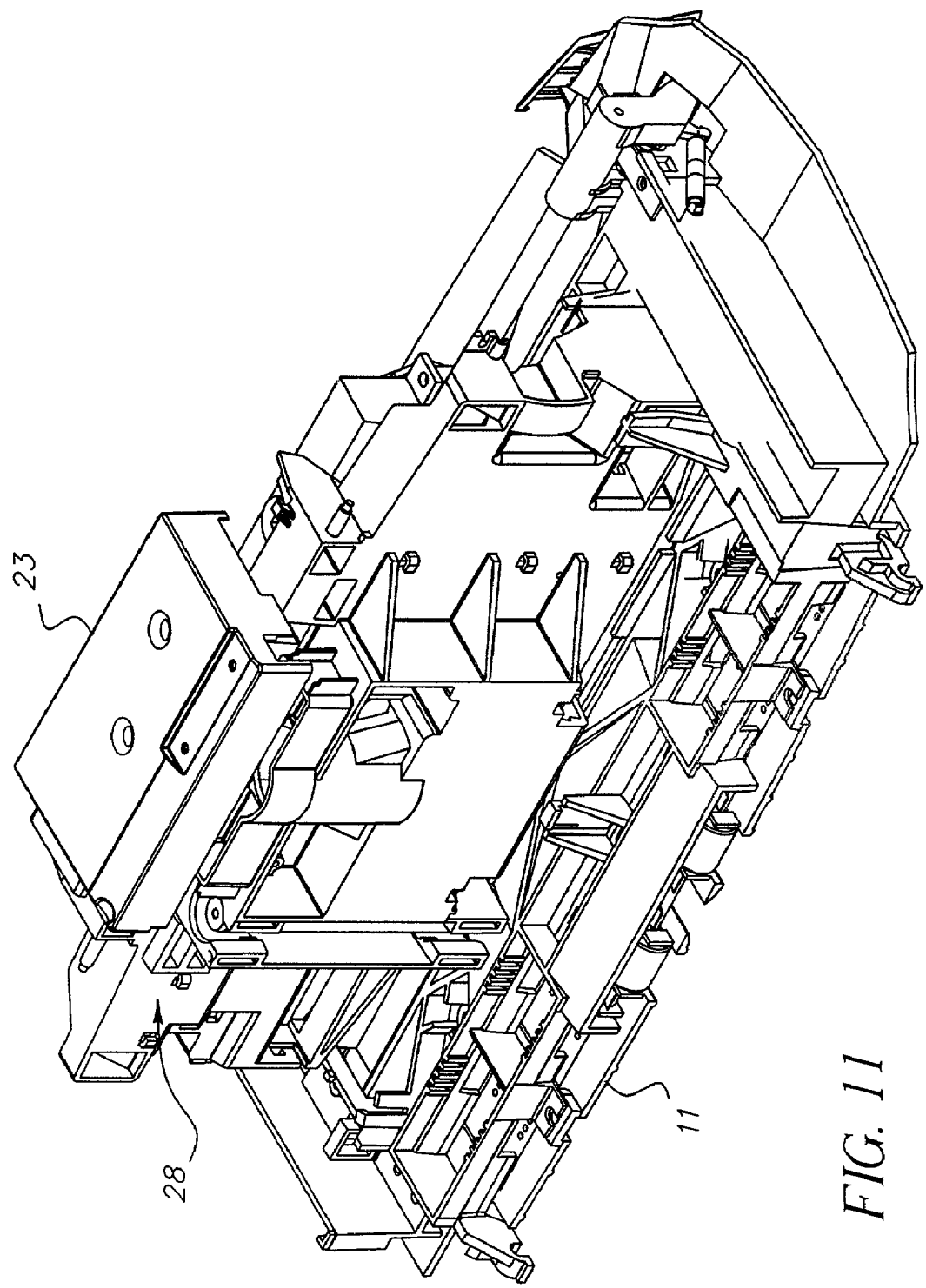

The upper and lower paper paths 11, 12 are also constructed with an upper and lower clear aperture area or glass window 17 and 18. The upper paper path consists of a substantially flat paper path portion and a structural supporting frame that is screwed to the path. This upper path is pivotably mounted to the lower paper path and in turn, the lower paper path is attached to a base structure. The upper path normal force rollers 14 are aligned and in contact with the lower paper path drive rollers 13 thereby forming a nip line through which drive is imparted to the sheets. The upper paper path rollers 14 are idlers that are spring loaded against the drive rollers 13 when the upper paper path is pivoted down and secured by the latching mechanism, as shown in FIGS. 9 and 10.

Mounted to the upper paper path 11 are an upper illumination source (lamp) 21 and an upper camera 23, shown in FIGS. 10–14. As sheets are moved through the paper path, an image of the top side of the sheet is formed by reflected light from the lamp off the sheet. The reflected light then bounces off a series of fold mirrors 27 and through a lens 26 where it is focused onto a charged coupled device (CCD) imager 25. The camera housing 28 hat holds the mirrors 27, lens 26, CCD 25, and CCD circuit board that make up the upper camera. The CCD width or (number of pixels) makes up one dimension of the image and the paper travel and successive lines of CCD output form the other dimension of the two dimensional image. This method of creating images is universally applied by scanners of the sheet fed variety where the illumination and camera are held stationary and the paper is moved past them. These images are then output from the scanner to a connected computer where they are either stored or manipulated for customer use. In the present invention, the illumination source is a Xenon gas fluorescent lamp but this approach could be accomplished by any suitable light source such as light emitting diodes (LEDs), Hg fluorescent, and halogen. In the present invention the CCD/lens reduction camera is of a four channel design (red, green, blue, and black) but could also be of a single channel design or any other desired makeup. In the making of a color imager, one could use a single channel CCD and then alternate their illumination source to be of red, green, and then blue light as an alternative to a multi-channel CCD with a "white" light source. The CCD/lens reduction camera (imager) could also be replaced with a contact array or other such imaging device.

Mounted within the base structure is a rod onto which a lower camera is mounted. In the same manner as described for the upper camera, the lower camera produces images of the bottom side of the sheets being fed as they pass over the lower paper path clear aperture. The lower illumination source is different in that it is pivotably mounted to the lower camera as opposed to being directly mounted to the paper path as is the case in the upper arrangement. While the exact function of this pivotable mounting is described later in the present application, the unique aspect of this feature as it pertains to the sheet fed scanner's paper path is that it allows the paper path to be considerably flatter than those typically found in sheet fed scanners. Also mounted to the base unit is a sheet support that receives sheets as they exit the paper path. This support is commonly referred to as an exit or output tray 4 as shown in FIG. 2.

To summarize the sheet fed scanning for a single sheet, the process begins with a command to feed, the sheet passes the clear apertures and is imaged on both top and bottom sides and then it is deposited in the output tray. For a stack of documents, this process is repeated until the stack is depleted.

Figure 5:
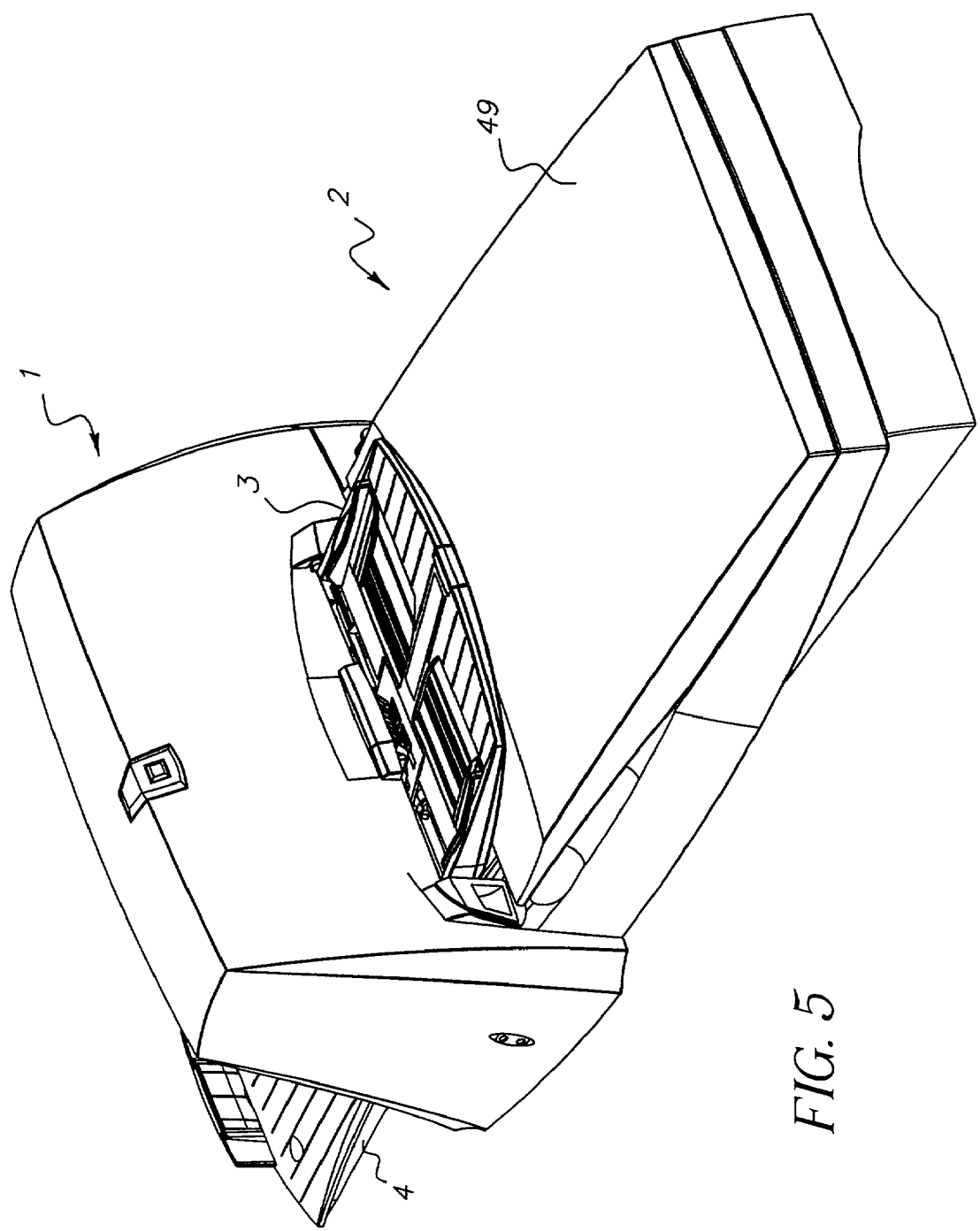
Figure 6:
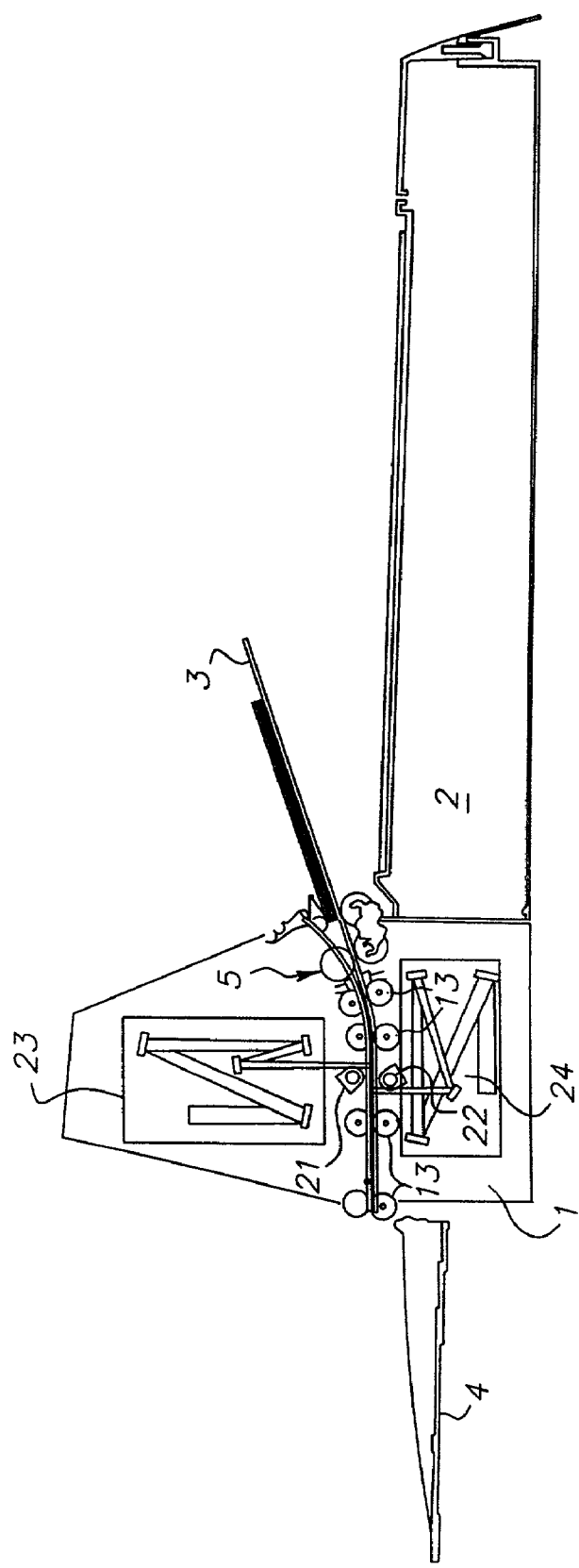
FIG. 6 is a side sectional view of the present invention illustrating the paper path, illumination source, camera location, input and output trays.
Figure 7:
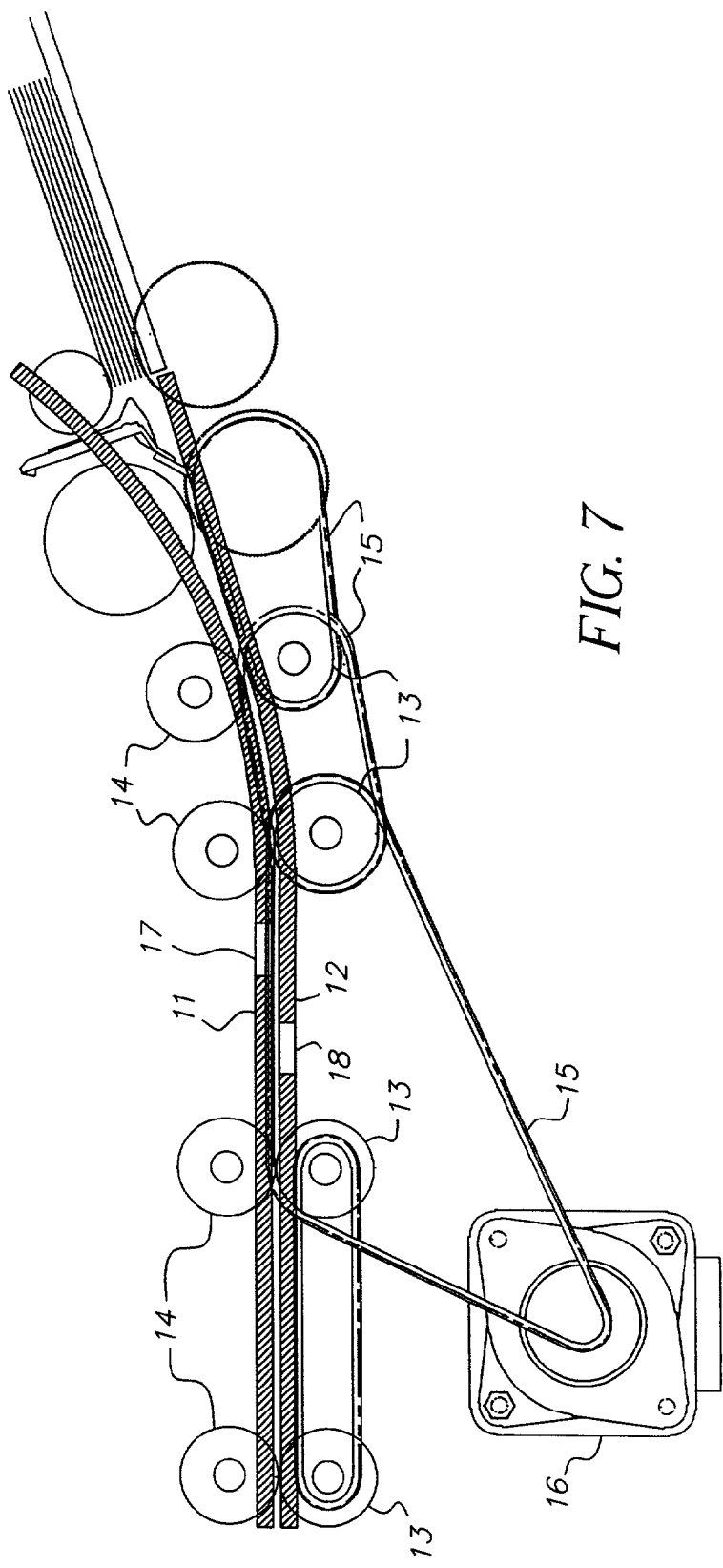
FIG. 7 is a detailed view of the sheet fed scanner paper path and sheet drive means.
Figure 15:
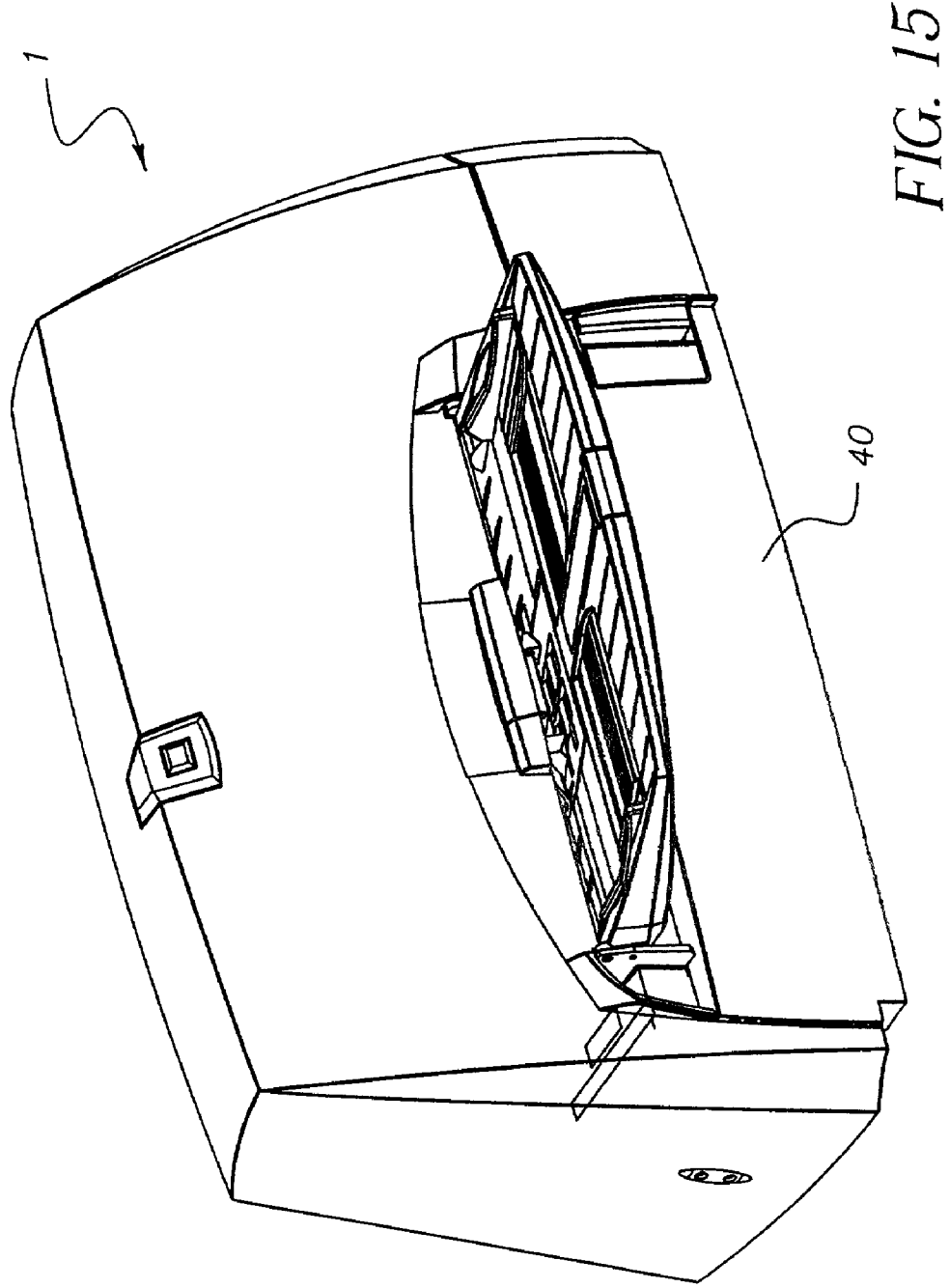
FIGS. 15–18 are perspective views of the removable door which exposes the opening in the base sheet fed scanner portion through which the lower camera moves to provide the platen scanning function.
Figure 16:
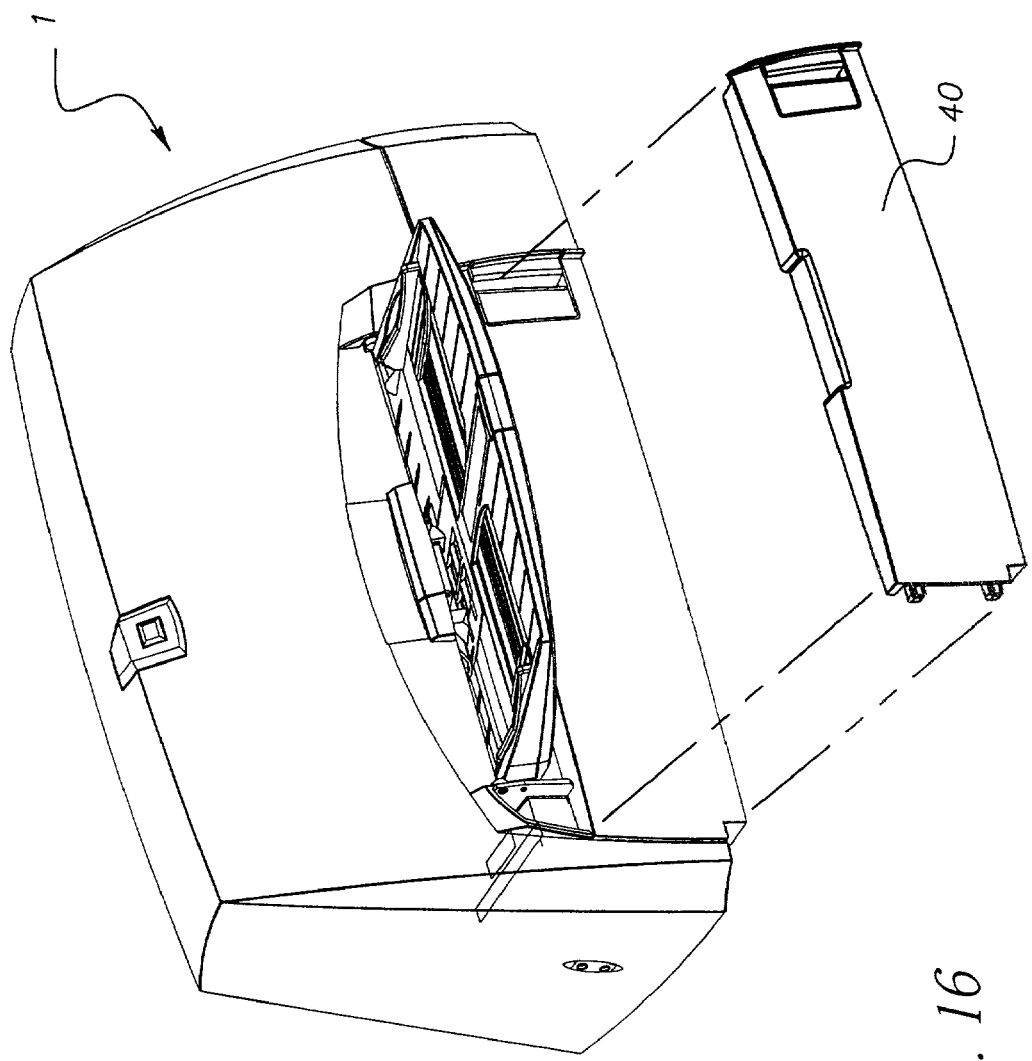
Figure 17:
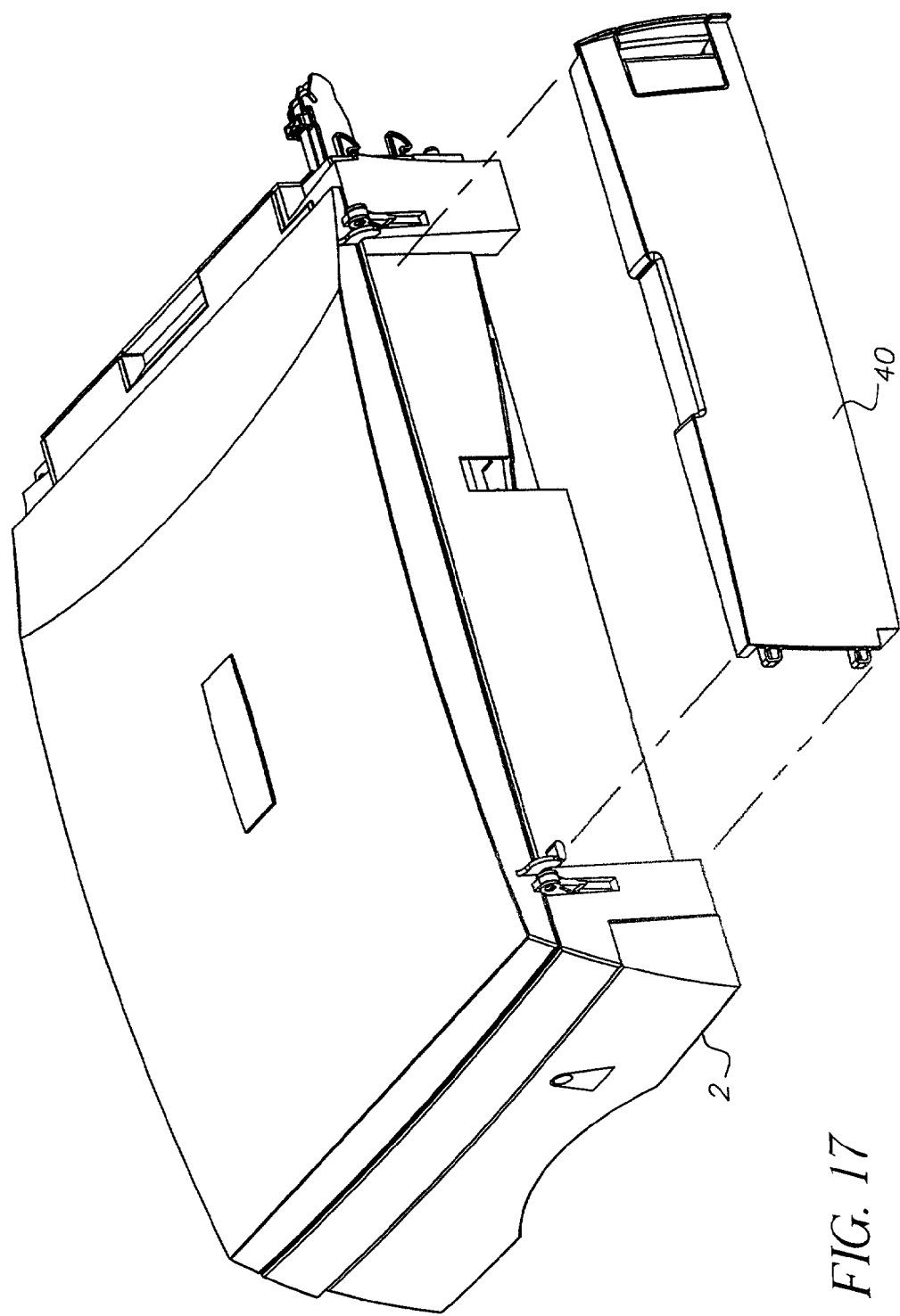
Figure 18:
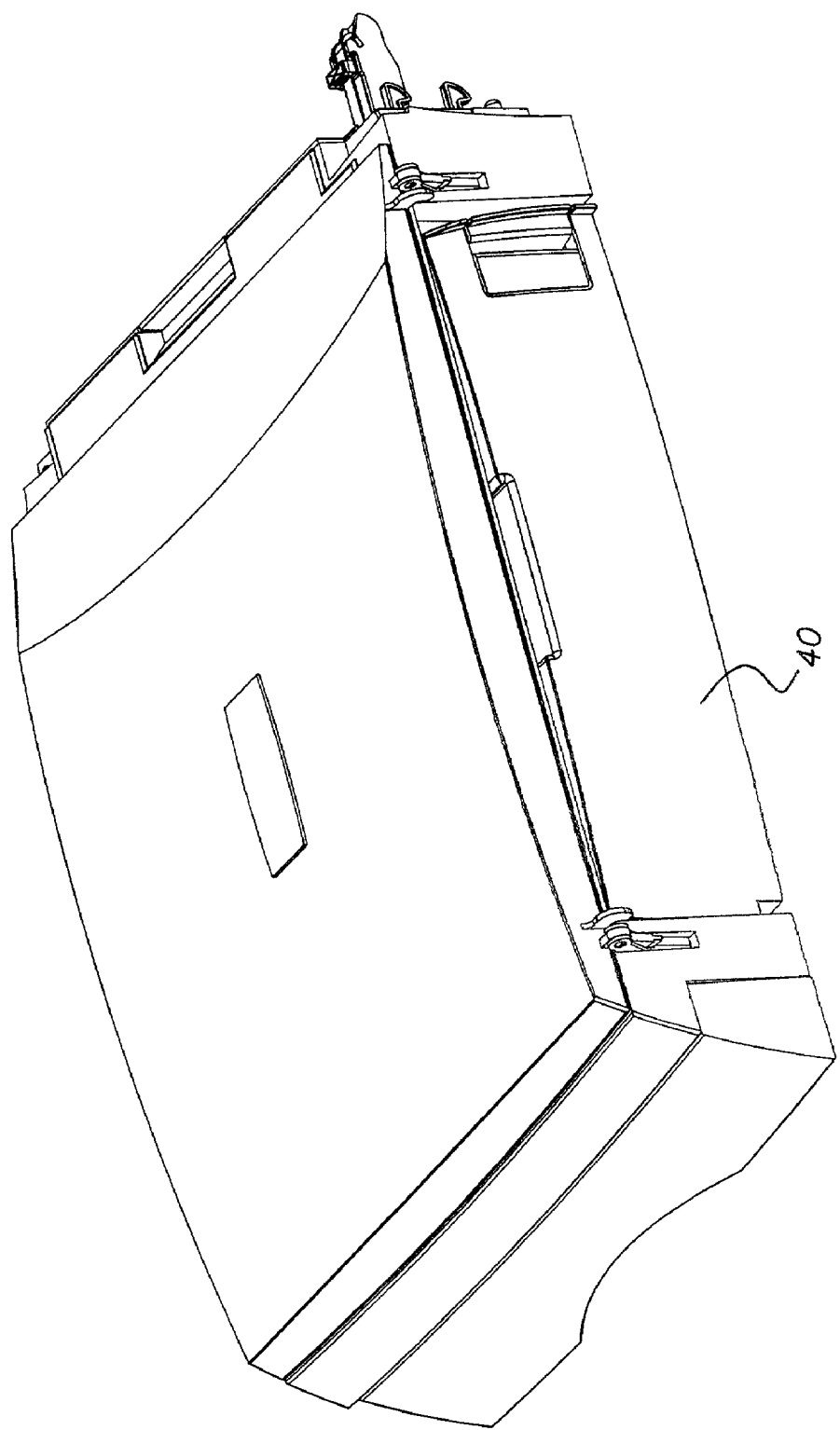

The following is a discussion of the platen accessory and the steps required to perform the docking and accomplish the platen scanning functions of this device. Included within the first sheet fed scanning unit is an opening that is covered with a customer removable door. FIG. 15 shows the sheet fed scanner with this door 40 in place and FIG. 16 shows the door 40 removed. When a detachable platen unit 2 is employed, the end user can mate this "platen accessory" to the sheet fed transport scanner 1 and the lower camera 24 from the sheet fed scanner can now move through the opening and into the platen accessory. FIGS. 4 and 5 illustrate the detachable platen unit 2 in position to be docked or attached to the sheet fed transport scanner 1. In order to attach the detachable platen unit 2 to the sheet fed transport scanner 1, the end user must first remove the door 40, exposing the camera opening. A stowage location is also provided as part of the platen housing 42 to facilitate storage of the door when the platen is attached, shown in FIGS. 17 and 18. This helps prevent loss of the door and makes the door readily available should the customer decide to reconfigure the modular scanner without the platen at a future time. In this present invention a removable door has been chosen as the manner in which to provide the docking opening but this could easily be done through a hinged door or other such approach.

Figure 19:
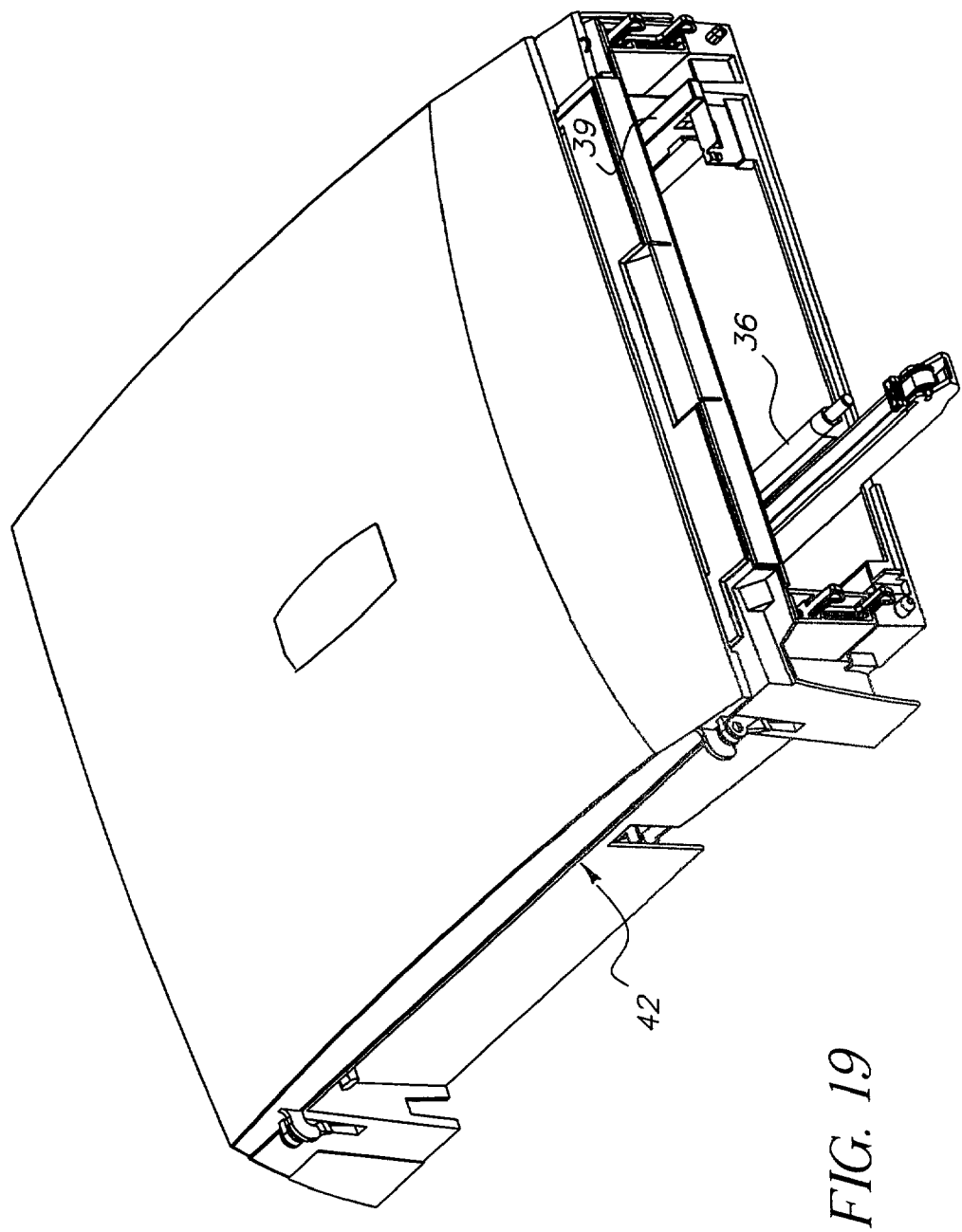
FIGS. 19–21 illustrate the platen unit major components.
Figure 20:
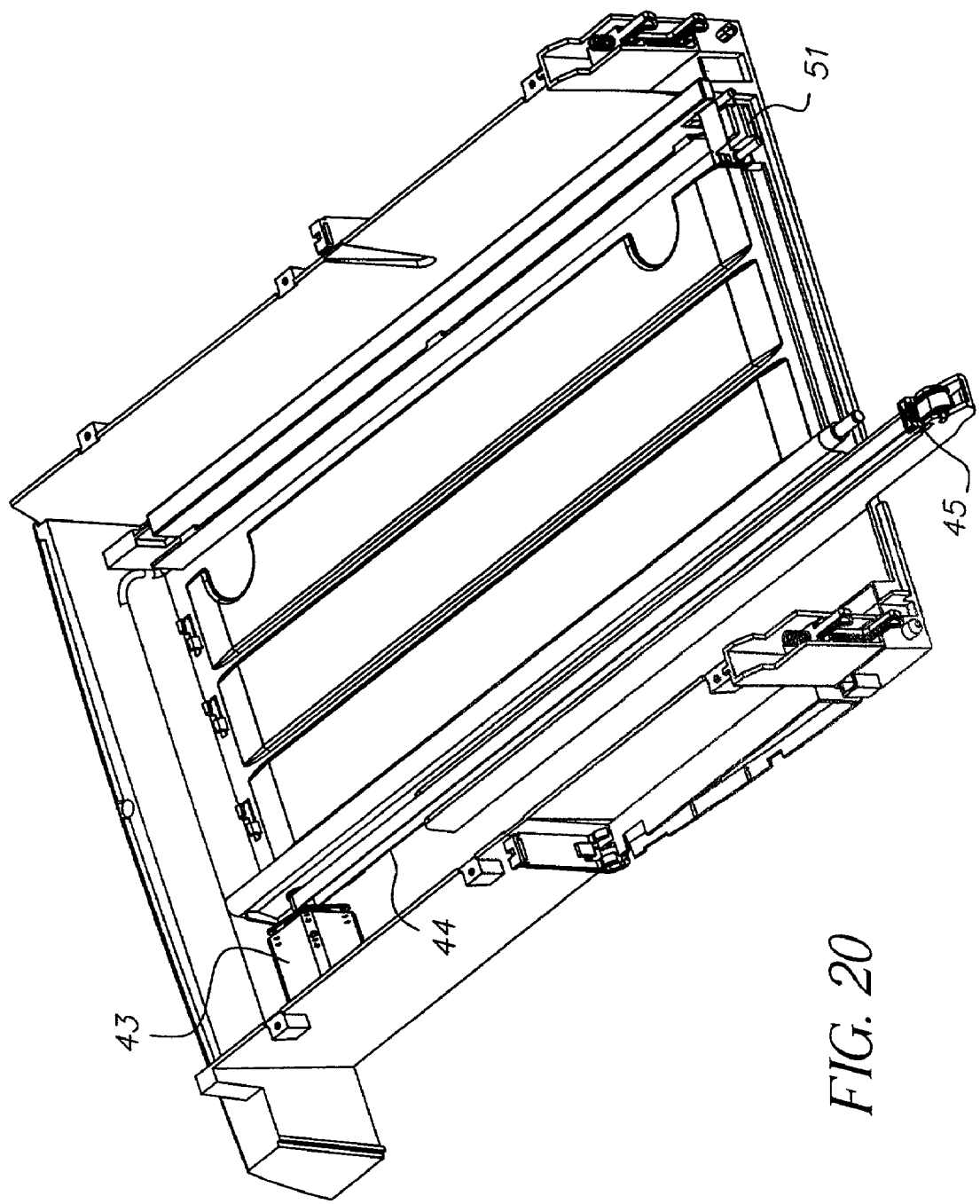
Figure 21:
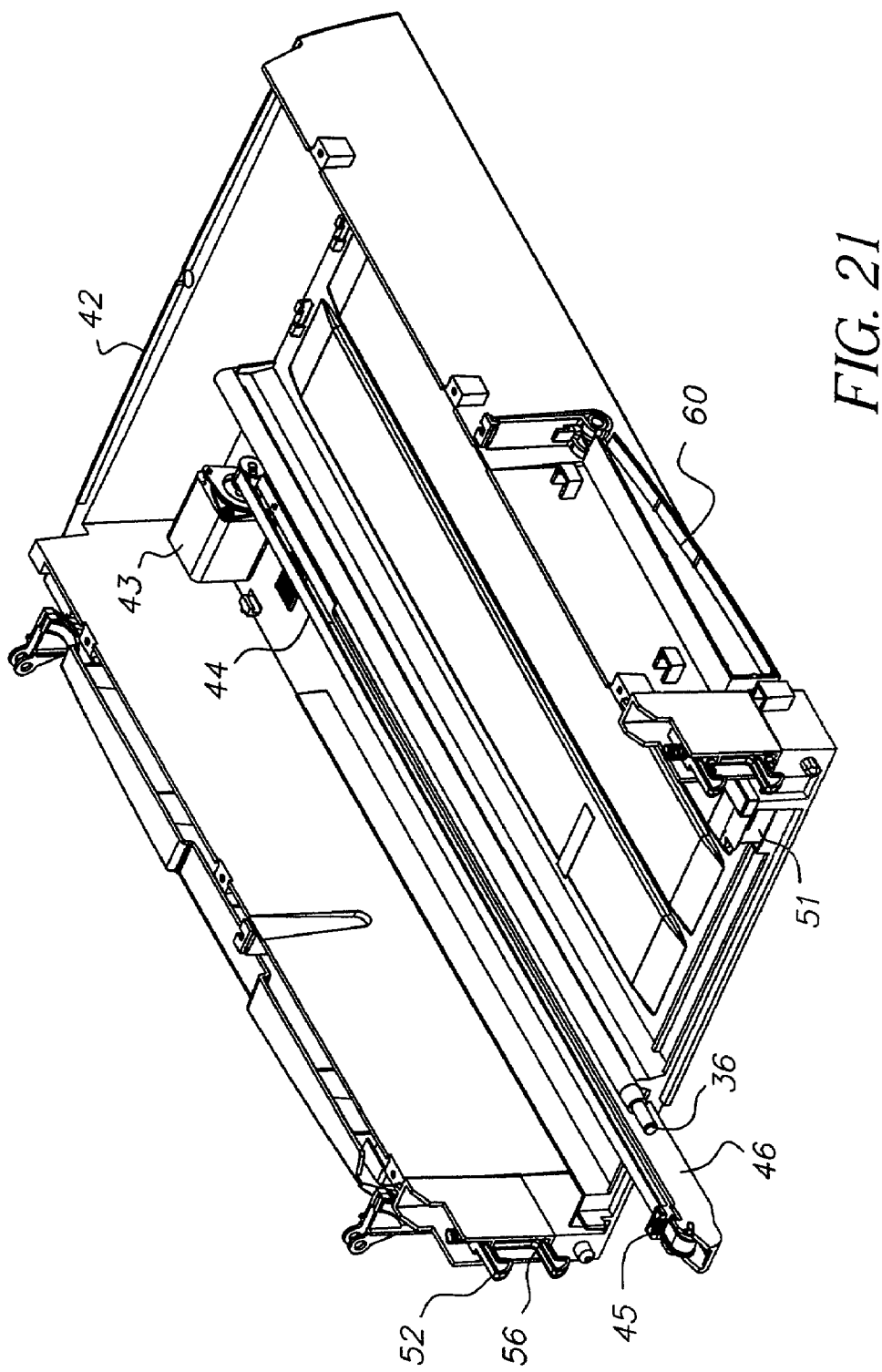

The detachable platen unit 2 consists of a five-sided platen housing 42 that contains an opening at one end, which aligns with the opening in the sheet fed scanner when the two units are docked (attached or mated), as shown in FIGS. 19–21.

A platen scan drive source (stepper motor) 43 receives electrical power and signals from the base unit or sheet fed transport scanner 1 through an electrical connection 51 formed at the docking interface. The drive motor 43 is connected to a platen scan timing belt 44 which is supported by the motor pulley at one end of the platen housing and by an idler pulley and platen protrusion member 46 at the other end of the housing. When power is applied to the drive motor 43, the timing belt 44 can move in either direction. Attached to the timing belt 44 is a magnet coupling 45. Upon docking the platen, the protrusion support 46 or housing extension and that portion of the timing belt 43 enter into the sheet fed transport scanning unit 1 opening. The timing belt magnet coupling 45 can then be driven via the stepper motor against a camera striker plate 47 mounted to the lower camera housing 28, thereby coupling the camera to the timing belt. While in this present invention, a magnetic coupling has been chosen to provide the connection between the timing belt and the camera housing, this could also be achieved by other mechanical coupling means such as a snap. These elements are best illustrated in FIGS. 20 and 21 showing a cutaway view of the platen structure and it's critical elements. In addition, alternative means to the timing belt such as a lead screw could be employed to translate the rotary motion of the motor into the lateral motion of the camera.

A clear window 48 or aperture is attached to the platen housing so as to provide an imaging region for the platen scanning function. The clear window 48 is framed by a portion of the housing. This framing portion is referred to as the bezel. On top of this window and bezel is a pivotable lid 49 used to flatten the document onto the glass during scanning and provide the desired background color (typically white or black depending on the application.) The detachable platen unit 2 is shown intact and attached to the base scanner 1 in FIG. 5. The lid 49 is shown in the down position but during scanning the customer would lift the lid, place their document on the glass, close the lid and make a scan. This approach to stationary document scanning is widely recognized within scanning devices.

Figure 22:
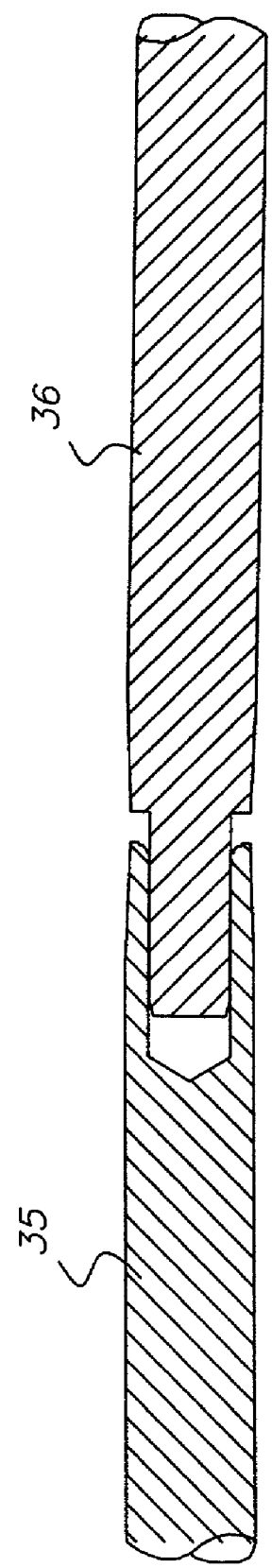
FIGS. 22–24 show a detailed view of the junction between the long and short guide rods and how the lower camera traverses along these rods.
Figure 23:
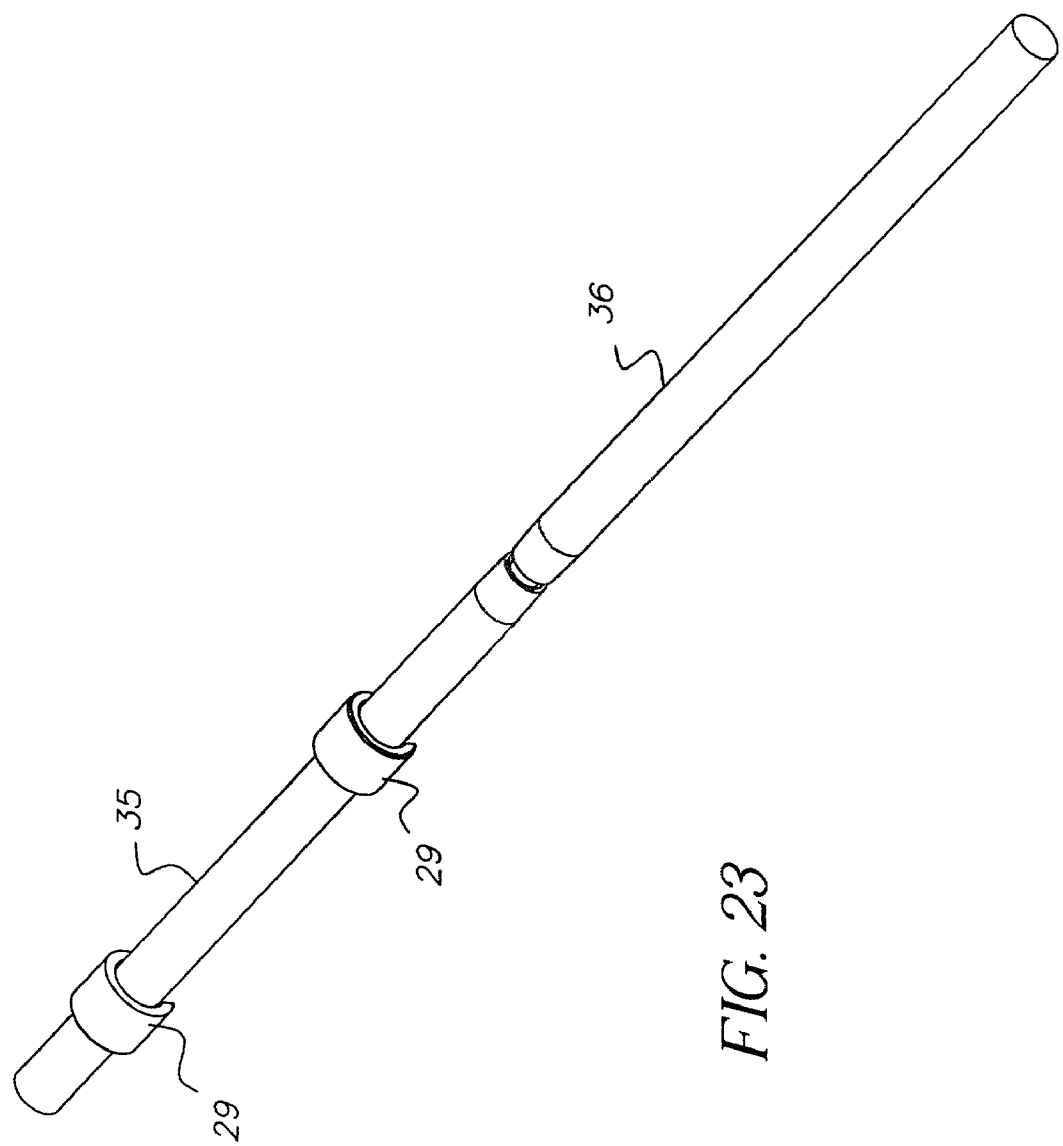
Figure 24:
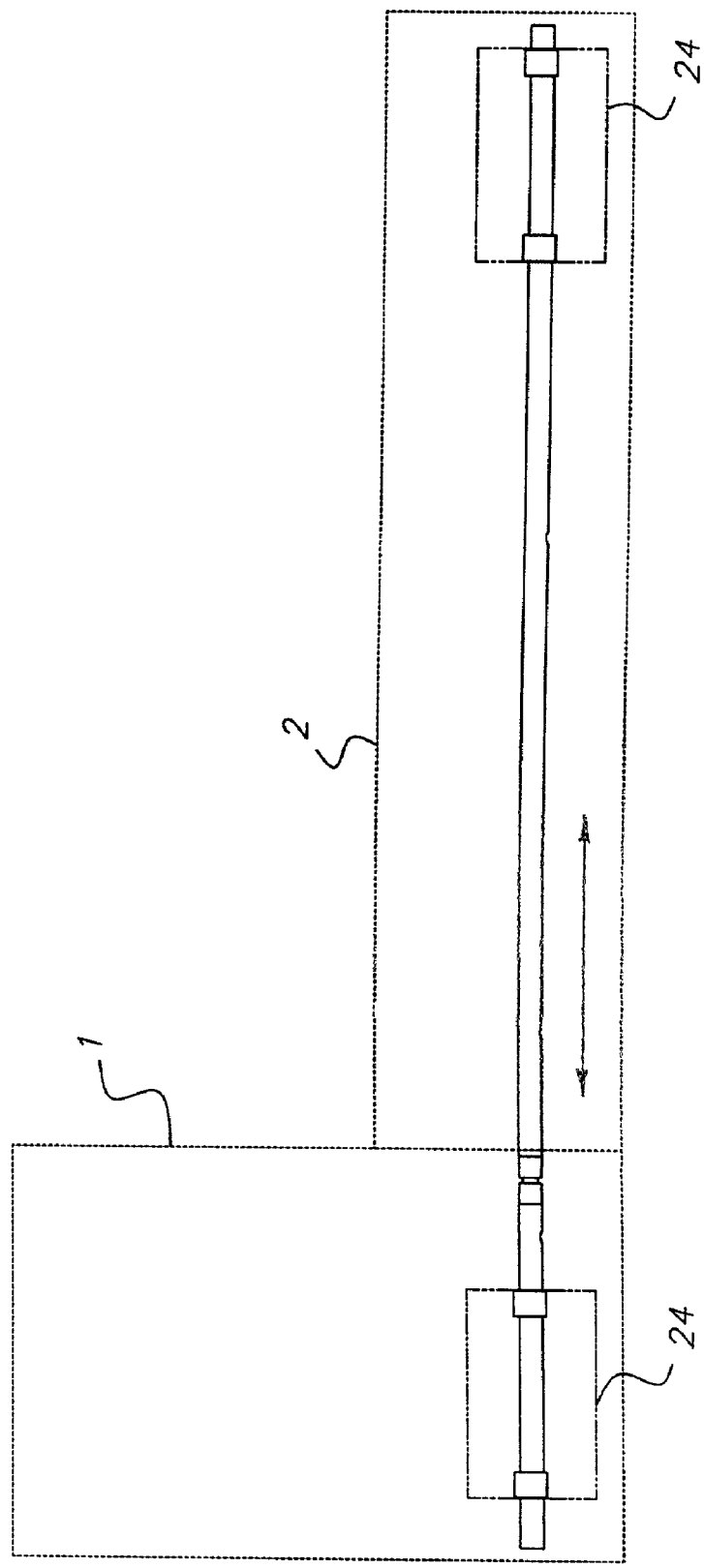
Figure 25:
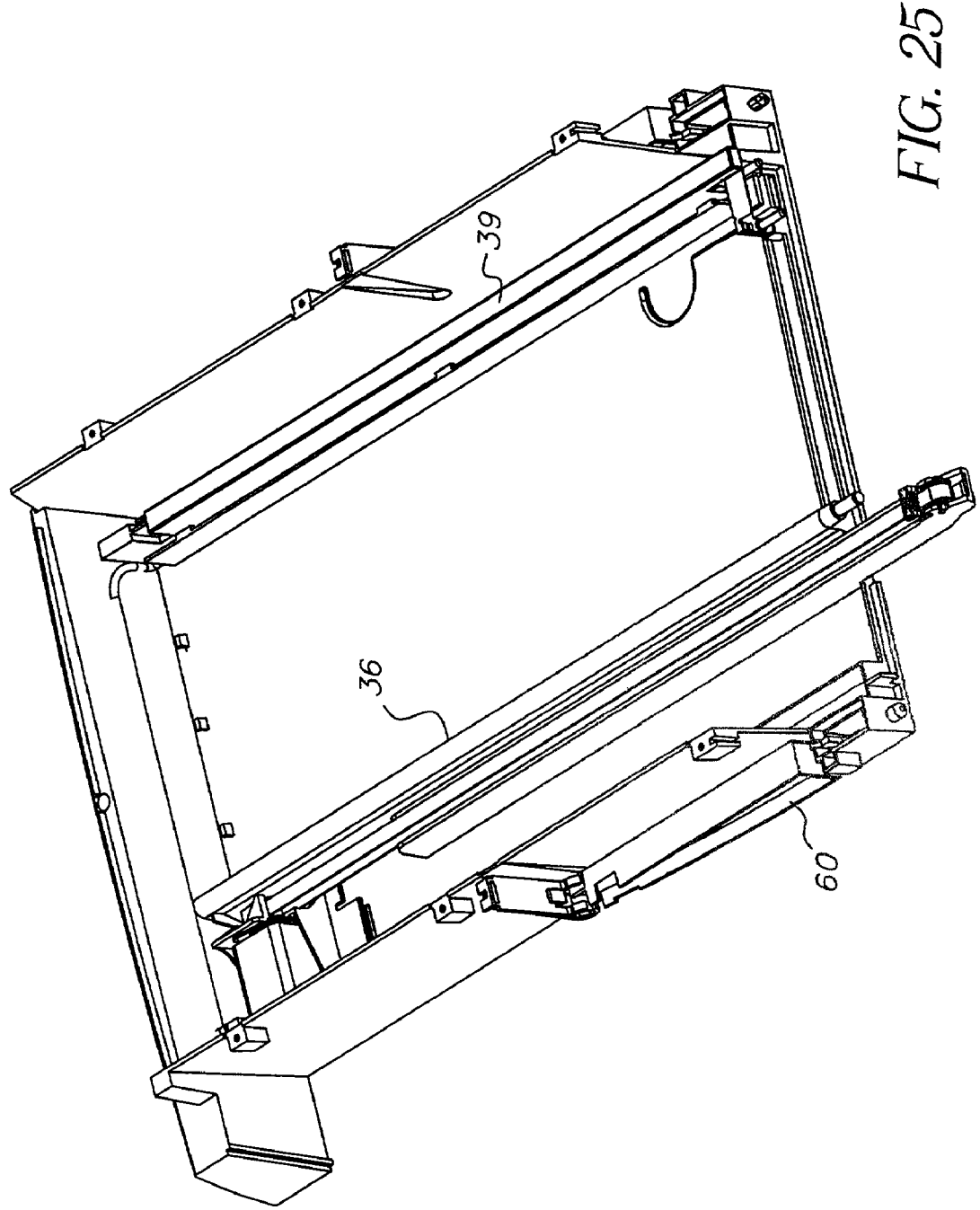
FIG. 25 is a cutaway view of the platen housing illustrating the long guide rod and support shelf features.

Upon docking, the end user moves the platen housing laterally along a table top surface toward the opening side of the base unit (sheet fed scanner.) This is an ideal motion for the customer, given the size and weight of the platen accessory (generally 20" long×14" wide by 4" high and about 12 pounds) and it is also an intuitive motion akin to docking a laptop computer. Alignment pins located in the platen housing mate with alignment features in the sheet fed scanner base housing. FIG. 21 shows the alignment pins of the platen housing and FIG. 16 depicts the mating slot and hole located in the base structure 37 of the sheet fed transport scanning unit 1. In the present invention, these features have been chosen as a circular boss and a diamond shaped boss that align with a hole and slot, but they could be any combination that achieves the proper alignment constraints. Attached to the platen housing 42 is a long rod 36. At the platen housing opening end of the rod, is an alignment pin. The base unit rod 35 has a bore in it that can accept the pin of the platen rod. The pin of the platen rod and the hole of the base unit rod are sized and tapered to allow for a male/female junction upon docking. This rod to rod mating in conjunction with the alignment features at either side of the housing openings brings the two units into proper alignment for platen scanning functionality. Several views showing the details of this rod to rod union and how the camera travels along these rods is depicted in FIGS. 22–24.

Figure 12:
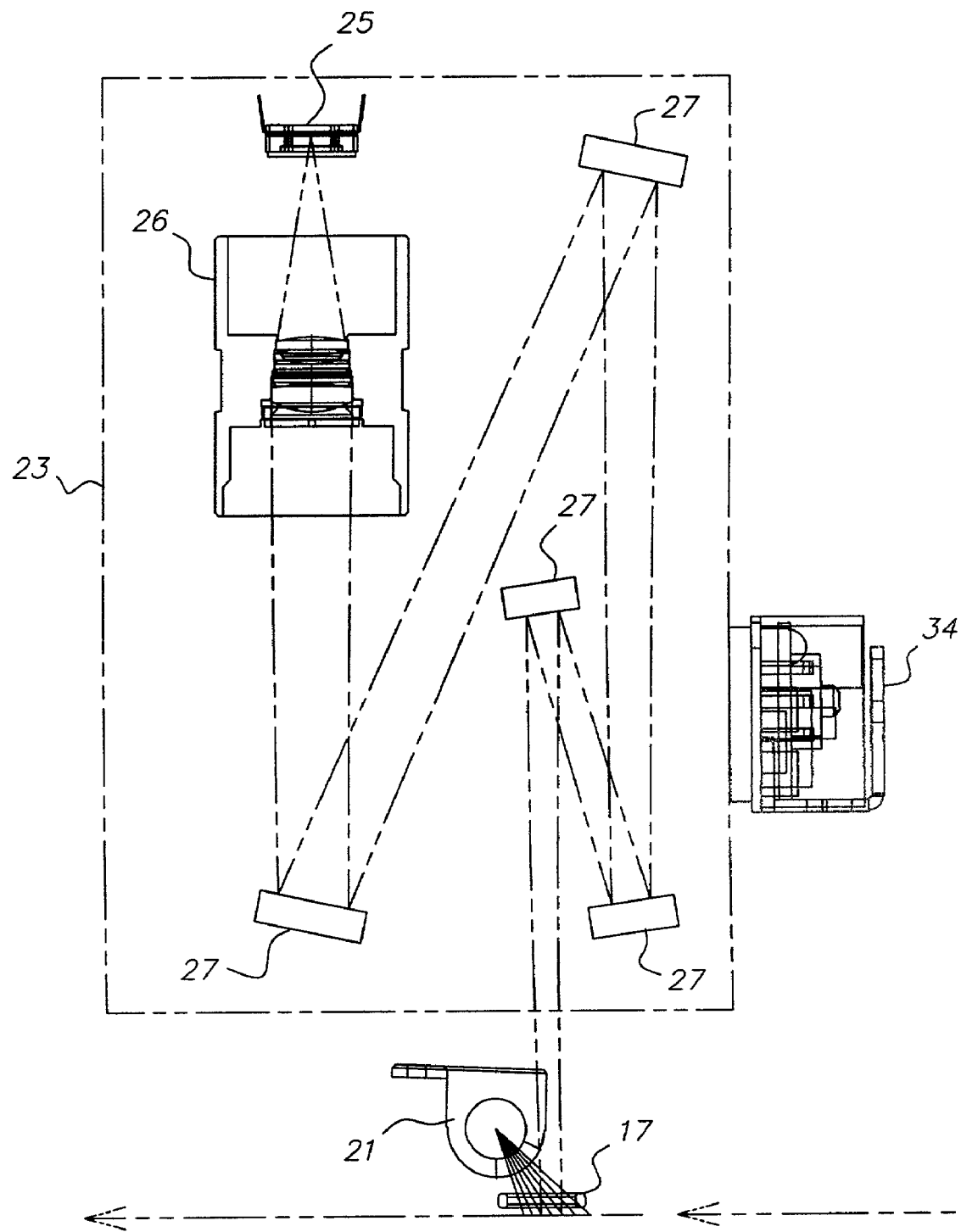
FIG. 12 is a schematic view of the optical fold and major elements of the upper camera and illumination source.
Figure 13:
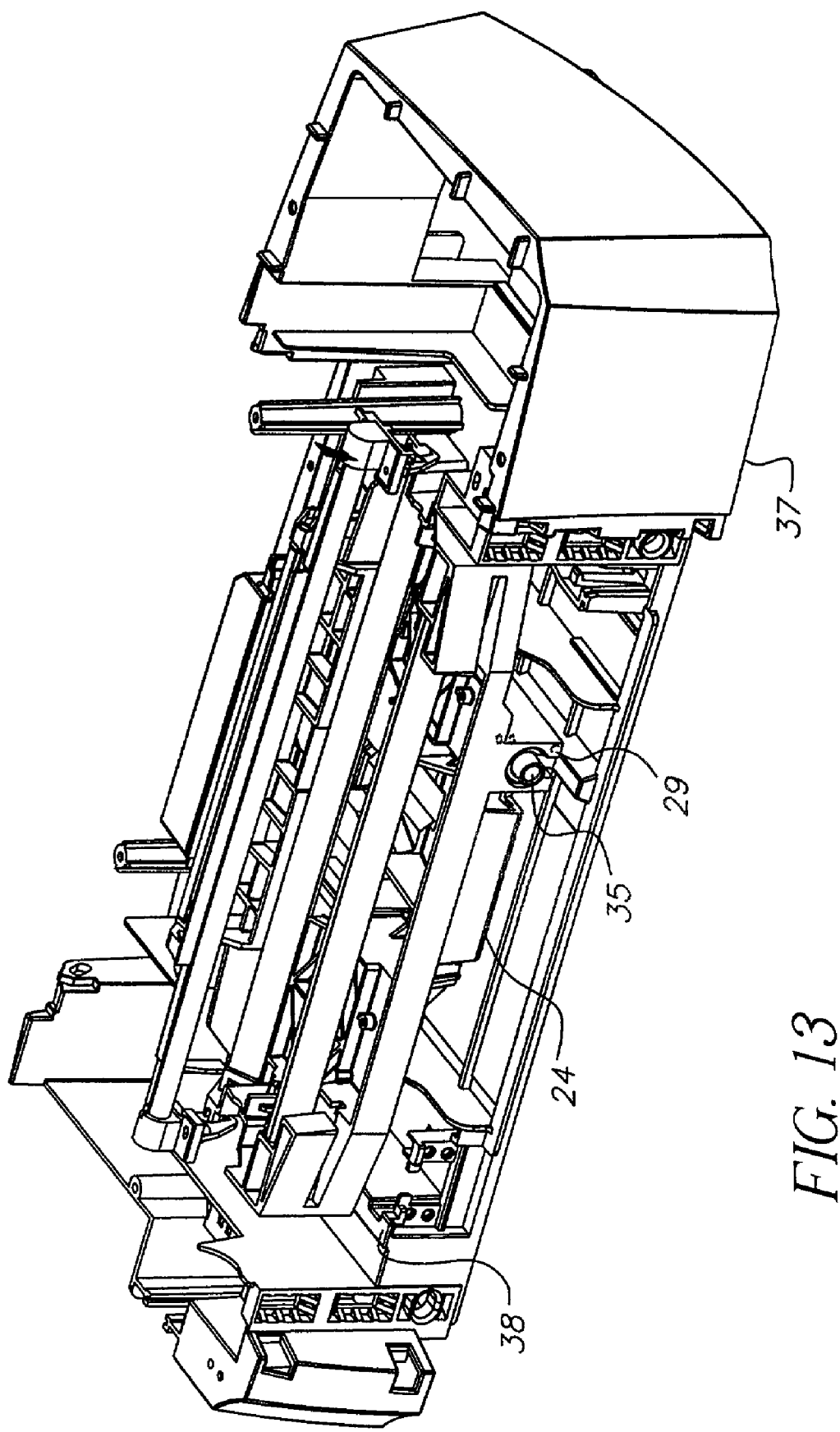
FIG. 13 is a perspective view, partially in phantom, of the lower camera in position within the base structure.
Figure 14:
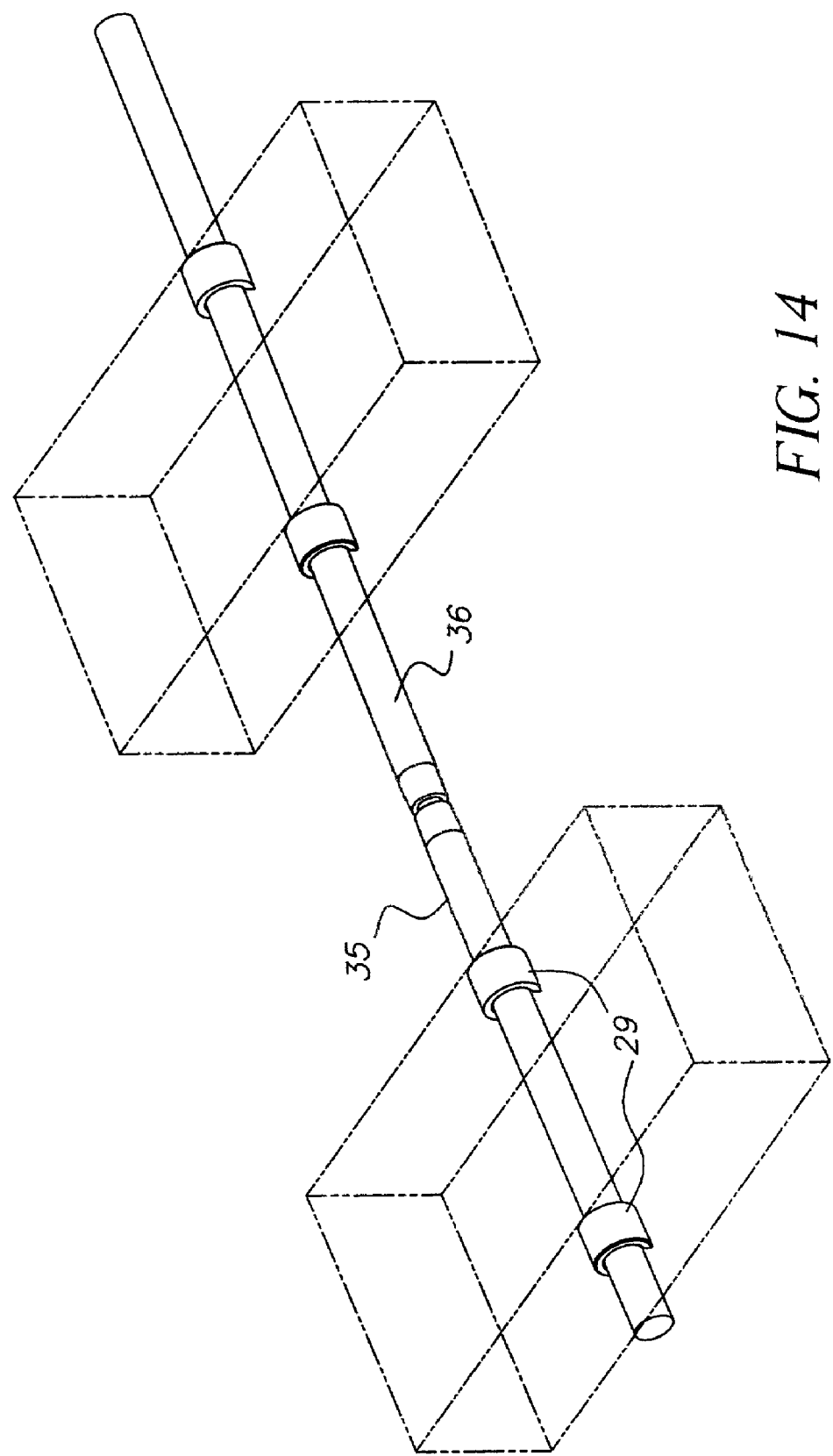
FIG. 14 is a perspective view, partially in phantom, of the short and long guide rods onto which the lower camera is assembled and along which the lower camera motion is provided.

The electrical connection 51 which provides power and signals to the platen drive source (motor) 43, is formed by a male/female connector half attached to the platen housing 42 and a male/female half attached to the sheet fed base unit housing 37. As the platen unit is moved into position, pins within the male connector align and engage sockets in the female connector half thereby connecting the platen motor 43 to a power and signal source provided by the sheet fed scanner electronics. In addition to providing power and signals to the platen motor 43, this connection can be used to sense the presence of the detachable platen unit 2 or the type of platen accessory installed, should more than one size or type of platen be offered. The location and style of this connection is shown in FIG. 12.

A latching mechanism including a set of latch hooks 52, a return spring, and latch release levers 60 are located on both sides of the platen housing 42 opening. As the platen housing 42 is moved laterally across the table top and the alignment features are brought into alignment, the latch hooks enter the base unit housing. When filly docked the latch hooks come to rest against the latch hook openings and are forcibly held against the housing by their return springs. This completes the end user steps for docking. In another embodiment, latch locks are employed to provide additional constraint to the latch hooks to form a more rigid connection and prevent unintentional undocking. The customer would engage these locks by sliding them into position or turning them. Once put into position they would lock the latch hooks from moving upward and thereby eliminate the possibility of unintentional detaching. FIG. 21 shows the latches 52 and one of the two latch release levers 60 that are used to disengage the hooks from the base box. FIG. 16 shows the base box with its rectangular openings that accept and engage the latch hooks.

Figure 26:
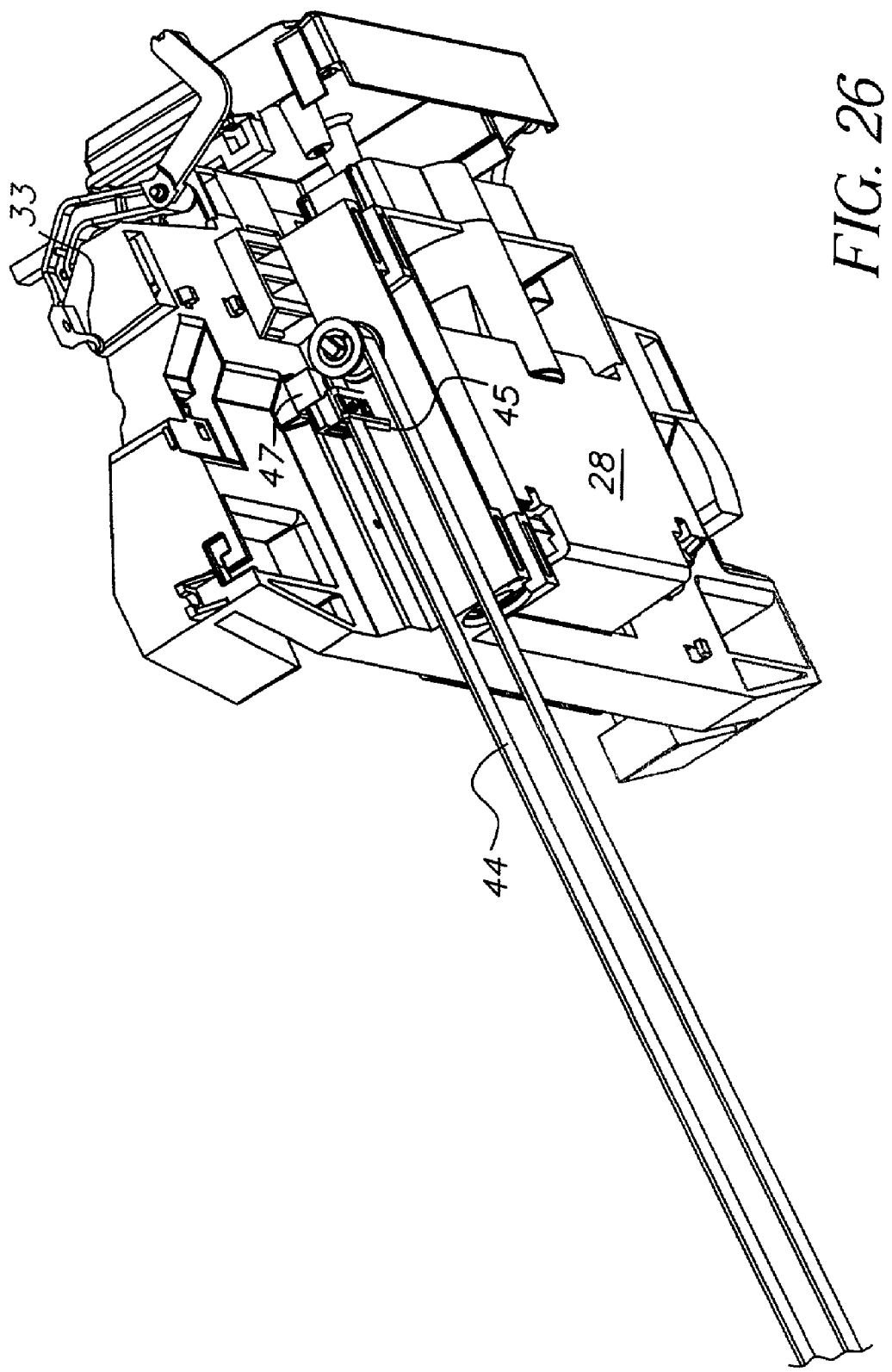
FIG. 26 shows a bottom view of the lower camera assembly detailing the area of magnetic coupling.

When power and signals are applied to the platen drive motor 43, the motor will rotate in a direction so as to move the platen timing belt 44 and the attached magnetic coupling 45 into contact with the camera striker plate 47 thereby satisfying all the aspects of docking; platen unit to base unit alignment, unit to unit latching, camera to timing belt coupling, and platen motor electrical connection. FIG. 26 shows an underside view of the lower camera 24 (imager) and detail of the magnetic coupling 45 coupled to the metal block or striker plate 47 which is mounted to the camera housing 28. FIG. 24 depicts the straight line motion that is imparted to the lower camera in either direction after docking has been achieved and the platen motor has been energized.

Figure 27:
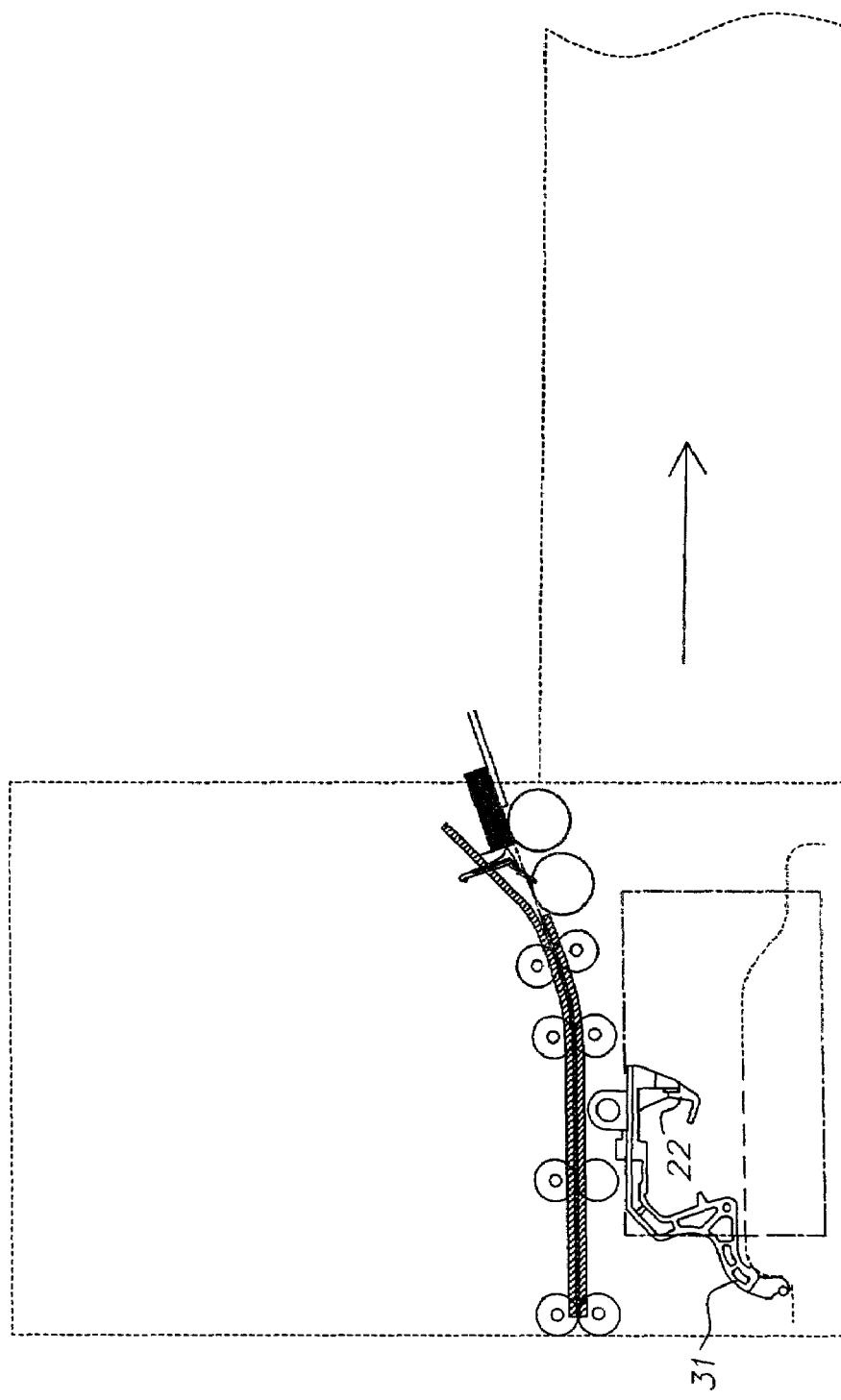
FIGS. 27–29 illustrate the retractable lamp motion as provided by the retractable arms and cam profile of the base structure.
Figure 28:
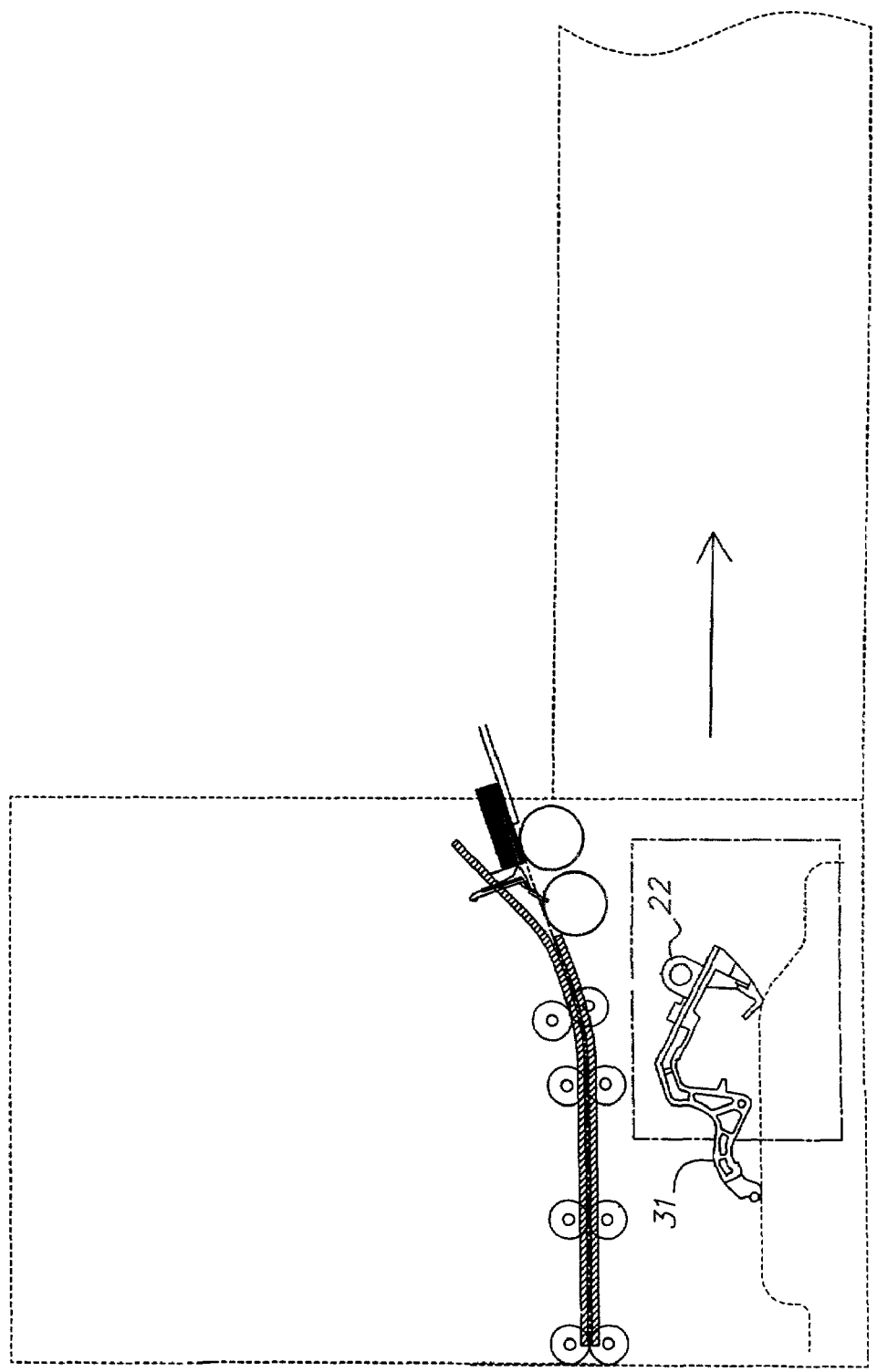
Figure 29:
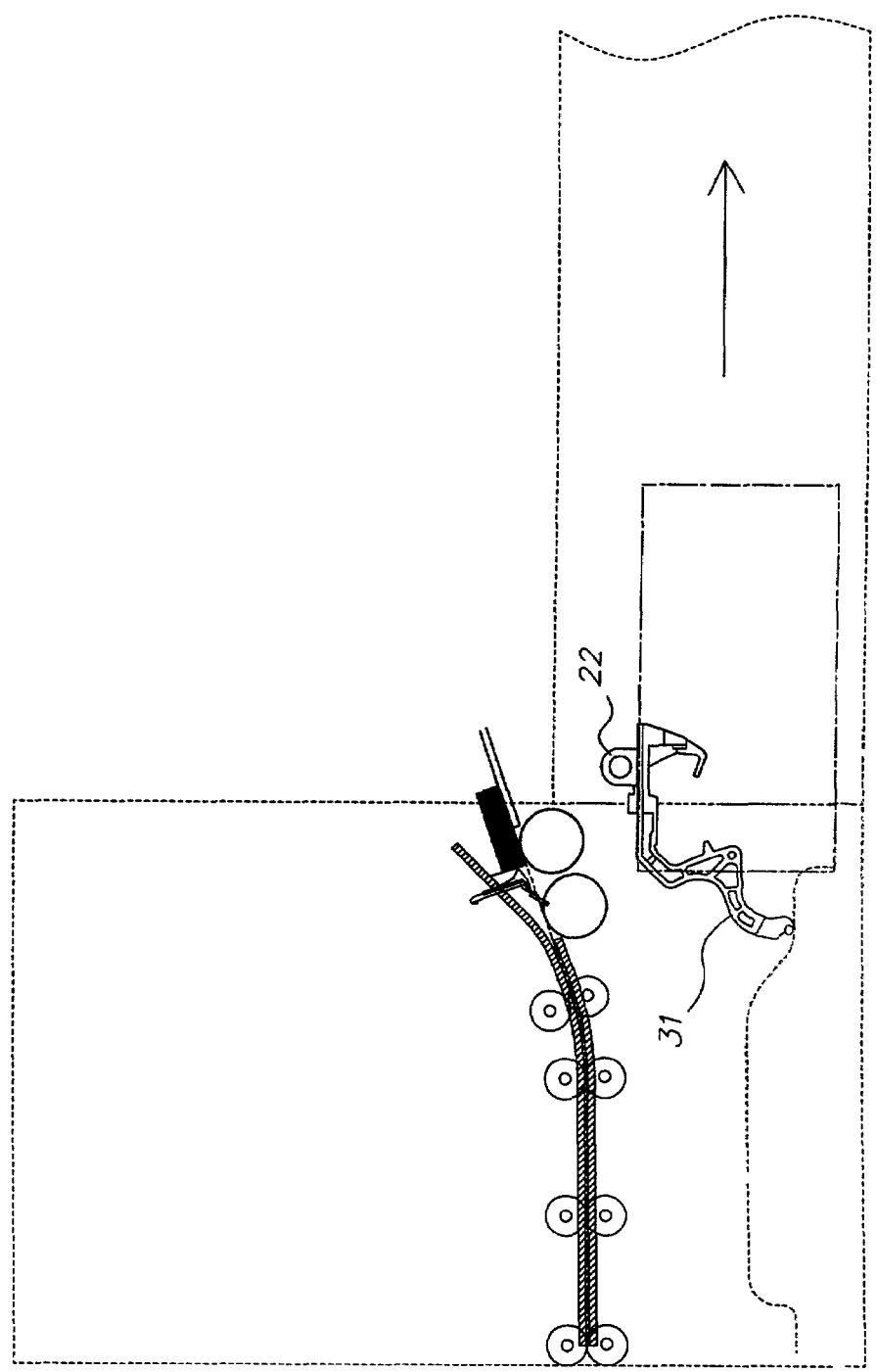

Platen scanning is accomplished by the following steps; after placing the sheet to be imaged on the clear window (aperture area of the scanner), the customer can command the scanner to make a platen scan of the sheet. Most often this is accomplished through the attached computer, which is referred to in the industry as the "host PC." It is also possible that this command could come from a control panel located on the scanner itself. Once commanded, the platen motor is rotated in a direction to remove the lower camera from its stationary position in the base unit housing and pull it to the opposite end of the platen housing. The lower camera consists of a housing 28, mirrors 27 that fold the reflected light, a reduction lens 26, a CCD imager 25, and a CCD circuit board for driving the CCD device and converting the analog voltage of the CCD to digital output. The camera housing 28 is designed to accept two "C" shaped bushings 29 which mount the camera assembly axially on a short rod 35 which is in turn mounted to the base structure 37 of the sheet fed scanning unit 1. A support shelf 38 or surface of the base structure supports the opposing end of the lower camera and works in conjunction with the bushings to fully align the camera. The base structure also contains a rib that determines the camera park or ready to image position in the base box. At two points on the camera housing 28, two molded in journals or bosses are provided. Onto these two bosses are mounted two retraction arms 31 which in turn mount to opposing ends of the illumination source or Xenon Lamp 22. Two torsion springs 32 are also mounted onto the bosses and they provide a force to align the lamp 22 and it's retraction arms 31 against two stops also molded as features of the camera housing 28. The two retraction arms 31 pivot on the two bosses and locate against the retraction arm stop features. This stop position is the position at which the lamp 22 is maintained when providing both the sheet fed and platen scan imaging. The pivoting motion allows for the lamp to be retracted into an opening formed in the camera housing 28, thereby allowing the lamp to pass under the upstream drive rollers 13 of the sheet fed scanner on it's way to the platen imaging area. As the lower camera begins it's motion, the lamp cam followers (retractor arms) come into contact with two cam surfaces which are part of the base housing 37, this causes the lamp to pivot about the two bosses on the camera housing 28 and retract into the opening within the camera housing. This provides clearance for the lamp to get under the transport and drive 13 rollers of the substantially flat paper path. At the platen side of the cam surfaces, the cam surfaces allow the lamp to return to it's scanning or up position. The lamp is held at its scanning position by two springs, which force the lamp retraction arms against locating features or stops on the camera housing wall. The cam surfaces and followers are designed, such that the lamp is back into it's scanning position before reaching the clear window (aperture) 48 of the platen housing 42. This lamp motion, the retractable arms, illumination lamp, pivot point and cam path are shown in FIGS. 27, 28 and 29. In addition, the lamp 22 is allowed to return to its full up or stop position when the lower camera 24 is fully returned to it's stationary or sheet fed scanning position in the sheet fed scanning unit 1. As the lower camera 24 is moved beneath the clear window (aperture) 48 of the platen housing 42, the motion of the lower camera 24 provides one dimension of the image and the width of the imager (CCD and lens reduction) provides the other. Just prior to reaching the leading edge of the platen window, the lower camera 24 can detect features that are on the bottom side of the platen bezel. These features which can be provided via a label and or molded into the bezel itself, act as a registration target.

The target features can communicate how close the camera is to the clear window as well as where the edges of the platen window are relative to pixel sites on the CCD. This allows the camera to establish a reference for both the left edge "starting line" and the bottom edge. The lower camera collects raster lines after passing the starting line as it is moved across the platen window. Upon reaching the opposite end of the platen housing, the camera aperture goes beneath the edge of the platen bezel where another registration target similar to the start line is found. This registration target or "finish line" communicates to the machine control, that the lower camera has completed the full motion of the platen and the motor is commanded to stop and return the camera to it's original starting position.

One critical region of camera motion is the junction area between the short rod of the base box and the long rod of the platen housing. This zone is referred to as the "transition zone." As the lower camera goes through this transition zone, the camera reacts to the "bump" caused by the bushings having to pass through the tapered junction. This reaction can take the form of an oscillatory vibration or wiggle that will affect the image. The degree of transition severity is governed by how well the two rods can be aligned both positionally (center to center and diameter match) angularity, (straightness), as well as the length of the lower camera bushings and the span between them. Sufficient taper region must be applied in order to compensate for any imperfection (tolerances) in the manufacture of the components or mismatch that occurs as a result of docking tolerances between the base unit and the platen accessory. These tapers are kept to a minimum level that will guarantee the smoothest possible transition without allowing for any possibility of binding. To avoid any image artifact that could be caused by such a disturbance, a region of settle out is employed. This settling zone is measured from the point at which the rear bushing moves onto the full diameter of the platen rod to the point where the clear window begins and stable imaging must occur. By optimizing the position of the transition, the length of the settling zone, and the geometry of the joint tapers, the camera disturbance can be effectively settled prior to imaging. In addition to the mechanical geometry of this region, the lower camera's velocity can be optimized as it passes through this region. By slowing the platen motor speed down as the camera approaches and goes through this joint, the level of disturbance can be minimized, thereby reducing the need for a long settling region. In this invention, this is accomplished by applying a slower step rate to the stepper motor as it passes through the joint. After passing the optimum point in the transition, the motor is accelerated using an "S" curve profile up to the desired speed for platen scanning. The "S" curve profile is important in minimizing any jerk to the camera body during this acceleration and utilizing "S" curves for smooth stepper motor acceleration and deceleration is commonly practiced.

Two potential failure modes that must be dealt with in this dockable platen concept are as follows. The hardware must not allow for the camera to be inadvertently removed from the base box when the end user removes the base unit opening door. Should the camera come out of the opening unintentionally, this could result in damage or contamination to the camera subsystem. In addition, the present invention employs a lamp power inverter which takes 24-volt DC input power and converts it to the necessary high voltage to run the xenon illumination lamps. This inverter is mounted to the lower camera housing and contains voltages that are too high to allow customer access.

Figure 30:
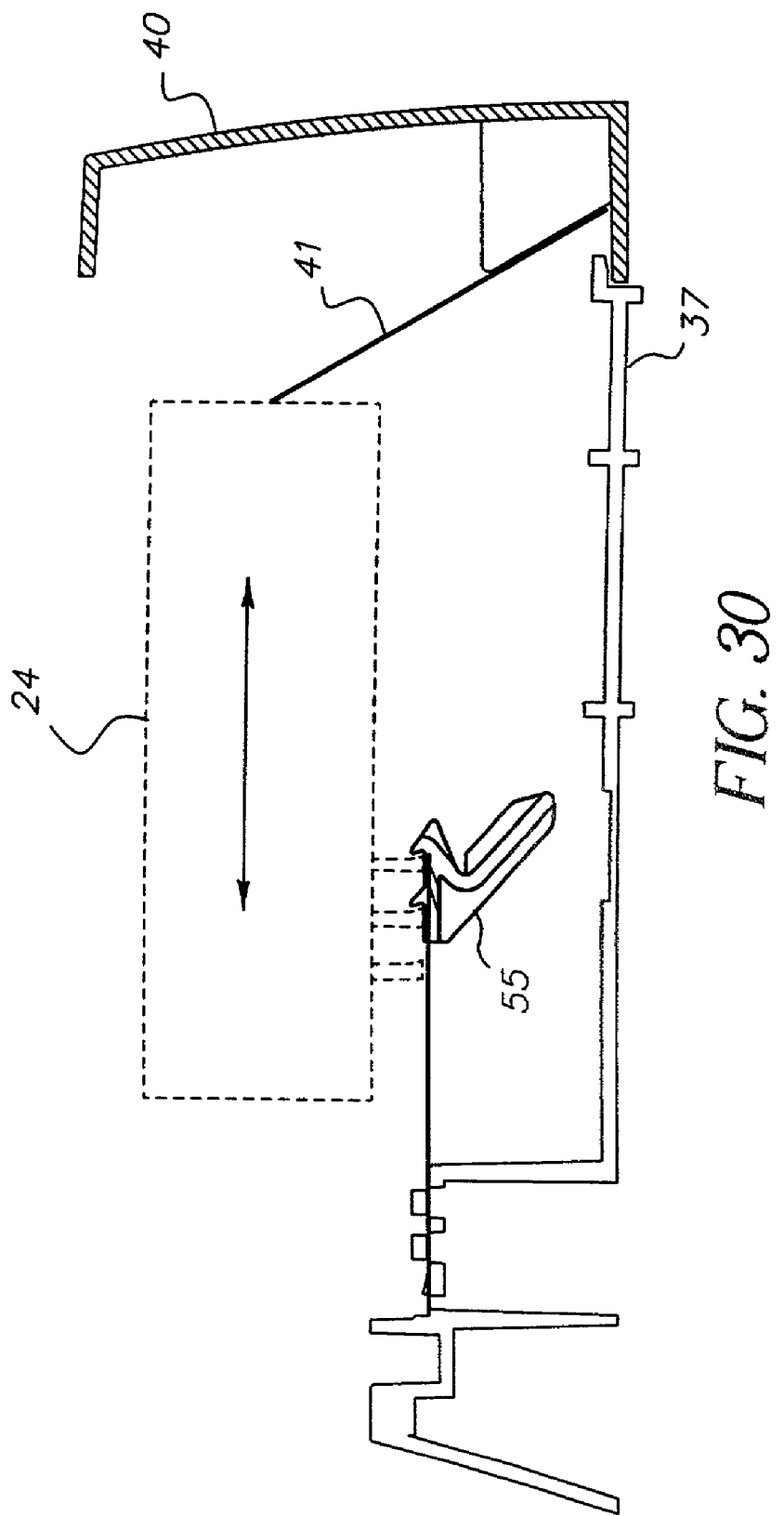
FIGS. 30 and 31 illustrate the camera lock feature.
Figure 31:
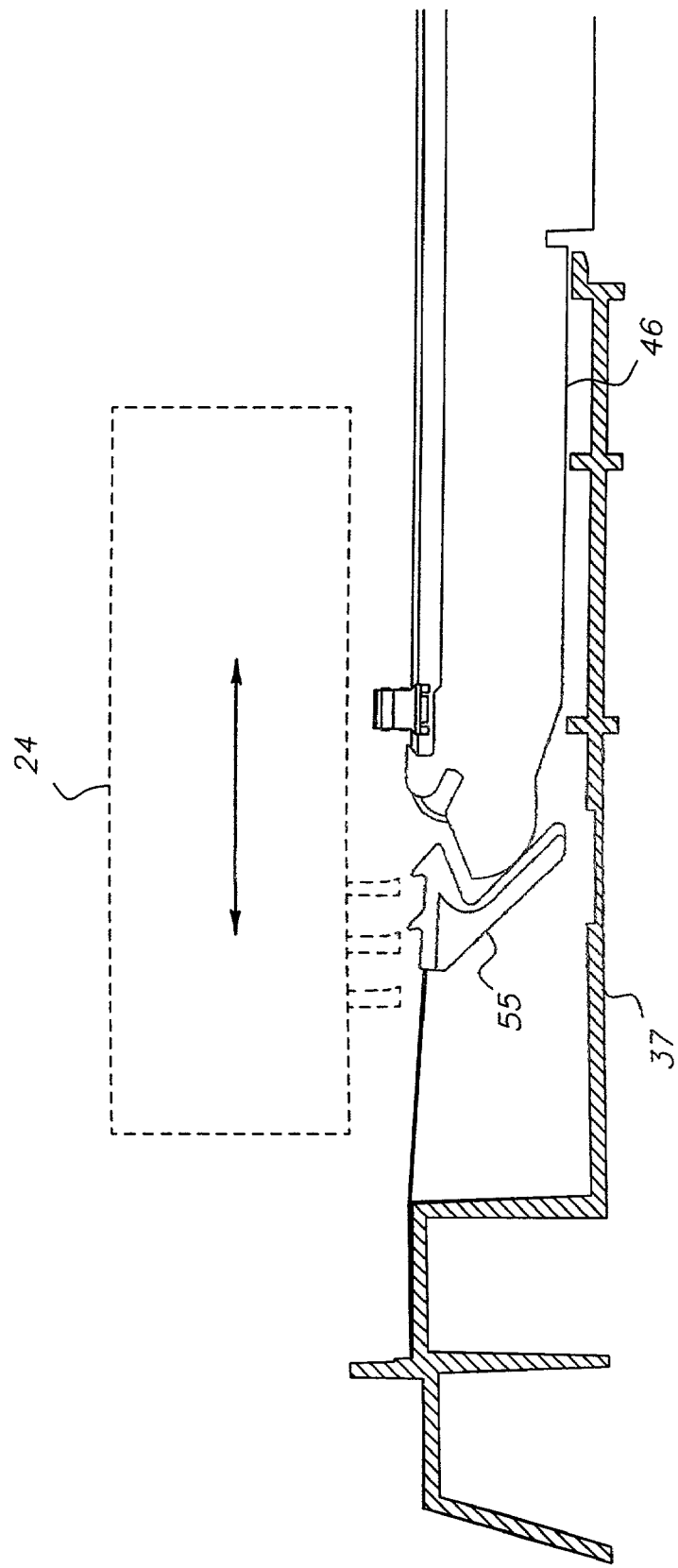

To effectively deal with the unintentional or accidental removal concern, a method of locking the camera in place whenever the platen accessory is not docked is necessary. FIGS. 30 and 31 show a side view depicting a locking function and the door spring that returns the camera to a datum stop when the door is replaced. The following describes features that insure that the lower camera is in the proper (home) position when a platen accessory is undocked but allows the camera the required motion it needs to provide platen scanning when the accessory is in the docked position. Mounted to the base unit housing is a flexible member referred to as the camera lock 55 with multiple ratchet style teeth. This lock is designed to apply a spring load in the upward direction. Molded to the lower side of the camera housing are several steps or ridges that are engaged by the locking teeth. In addition, the base unit door is equipped with a flexible member, which serves to push the camera back into the base unit box and against its registration datum or stop. The protrusion 46 of the platen housing 42 which mounts one end of the platen timing belt 44 is shaped so as to force the lock down and out of engagement with the camera housing when the platen is brought to it's fully docked position. The position of the lock 55 and the design of the platen accessory extension member are such that the lock is disengaged in the last 0.250" to 0.500" of docking motion. Upon undocking or customer removal of the platen, the camera begins to move out of the base box in response to the magnetic coupling pulling on the camera housing. When the extension or platen protrusion 46 moves out the 0.250" to 0.500", the protrusion disengages the camera lock 55 and the lock member springs upward engaging the camera housing 28 thereby preventing any further motion of the lower camera 24. The camera and base housings themselves are designed in a manner such that the 0.250" to 0.500" of play does not allow the camera to come out enough to cause any unwanted access risks to the end user nor present any camera subsystem reliability or contamination concerns. Upon removing the detachable platen unit 2 the customer replaces the removable door 40, which is equipped with a flexible member or camera return spring 41. This return spring forces the camera housing 28 back into it's stopped position and the door is held in place y snap features that engage the base structure 37. When the platen is docked is docked and the customer is using the sheet fed scanner portion for imaging, the camera is held against its stop in the base structure by means of the internal resistance of the stepper motor.

To prevent user access to the high voltage aspects of the illumination inverter, the base structure of the sheet fed scanner is fitted with an interlock switch. This interlock switch is held in the closed or live position by features on the platen door and an analogous feature on the platen accessory housing. Whenever the door or the platen is in place, the voltage can be applied to the lamps, but if neither the door or platen accessory is in place, the interlock switch is open thereby eliminating any high voltage concern. FIG. 21 shows the tab that actuates the interlock switch. The interlock switch, not shown is mounted into the base structure and is a typical plunger type switch commonly used for safety interlock applications.

In this invention, the paper path is formed in a much flatter arrangement to alleviate the concerns of the sharp bend. To accomplish the clearance of the illumination source moving out under the rollers, a retraction means in employed to allow the illumination source to lower as the camera moves out of it's sheet fed position and go under the upstream rollers. Prior to reaching the platen clear aperture, the illumination source returns to its nominal height for imaging.

Figure 32:
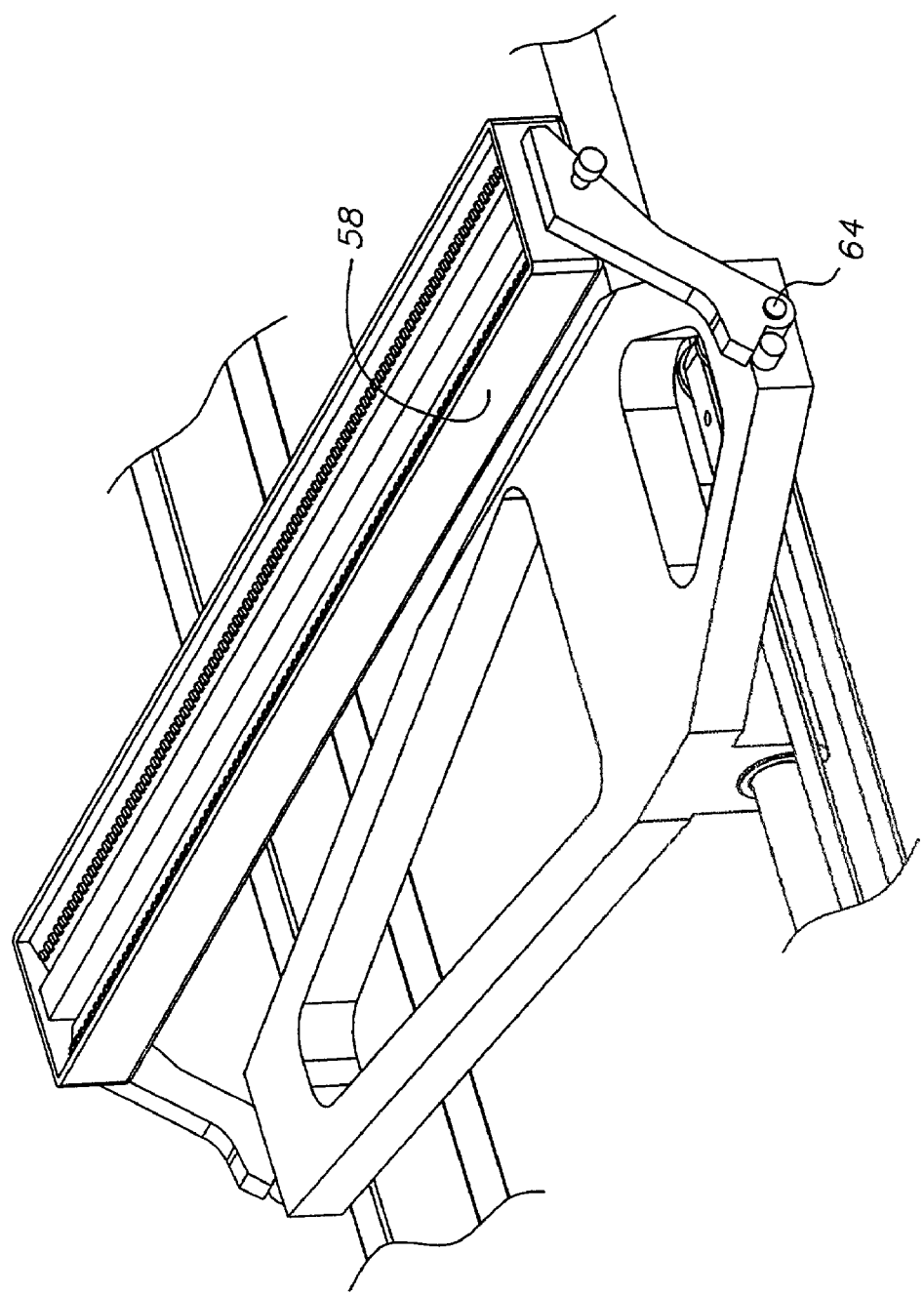
FIGS. 32 and 33 show an alternative embodiment wherein a contact array imager is substituted for the retractable illumination.
Figure 33:
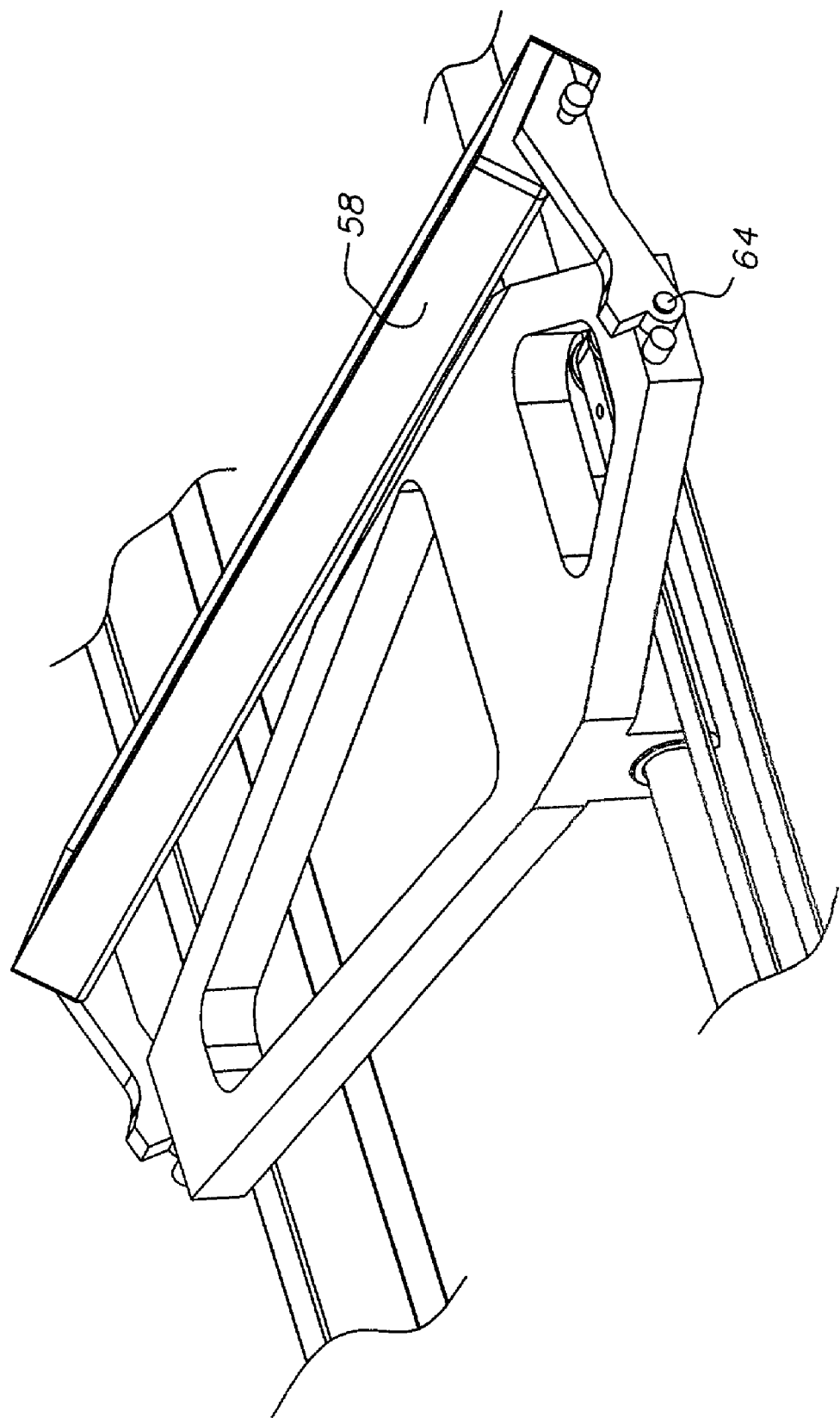

While this invention has been primarily designed with an illumination source and a charge coupled device (CCD) lens reduction imager, it could also be applied to other imager approaches used within the scanner trade. One such imager approach involves what is known as a contact array image sensor 58. FIGS. 32 and 33 depict a pivotably mounted contact array imager 58 with LED illumination source. In these devices, pixel sites are created within a long bar or stick which is essentially the full width of the widest sheet to be scanned plus some amount extra for positional tolerances. In contrast to the lens reduction systems, these pixels are configured such that the paper image to pixel magnification is either 1:1 or very close to 1:1. This is generally accomplished by placing the pixels sites very close to the paper to be imaged and employing some form of self focus lens element. As is the case with a CCD lens reduction system, these imagers require an illumination source to direct light onto the document which is then reflected back onto the pixel sites to form the image. In many cases, these contact array elements, are manufactured in a way that combines the illumination source, the pixel sites and their controlling circuitry into one self-contained unit or stick. Different illumination sources are employed but most commonly these devices utilize either a fluorescent (mercury or xenon) lamp or LEDs. In color scanning the LEDs can be configured such that there are individually pulsed red, green, and blue elements.

Applying this invention to the contact array devices would take the following form. A contact array device could be mounted on a pivot 64 such that its imaging position could be at or directly below the paper plane within a sheet fed scanner. As is the case, with the retractable illumination source and CCD imager, the contact array could then be pivotably mounted in a manner that would allow its retraction to pass under the upstream paper path rollers. After clearing the rollers, the contact array device could return to it's original plane and be moved under a platen glass element to provide the platen scanning function.

While the invention has been described with reference to specific and preferred embodiments, it should be understood that aspects of the invention may have application in other context and that variations and modifications to the present invention may become apparent to those of ordinary skill in the art. It is, therefore, contemplated that such variations and modifications be encompassed within the scope of the invention and the following claims.

PARTS LIST

1. Sheet fed transport scanning unit
2. Detachable platen unit
3. Stack support (input tray)
4. Output tray (exit hopper)
5. Auto feeder mechanism
6. Pressure roller
7. Pre-separation pad
8. Separation roller
9. Feed roller
10. Urging roller
11. Paper path (upper)
12. Paper path (lower)
13. Drive rollers
14. Idler (normal force) rollers
15. Timing belts (sheet fed transport)

16. Drive motor (sheet fed transport)
17. Glass window (clear aperture) upper camera
18. Glass window (clear aperture) lower camera
19. Idler (normal force) roller springs
20. Latch
21. Illumination source (Xenon Lamp) upper
22. Illumination source (Xenon lamp) lower
23. Upper camera
24. Lower camera
25. CCD imager
26. Lens
27. Fold mirrors
28. Camera housing
29. Camera C bushings
30. Lamp Pivot Boss Feature
31. Lamp Retraction Arms
32. Lamp Retraction Arm Springs
33. Lamp Retraction Arm Stop Features
34. Lamp inverter
35. Short Guide rod (base box)
36. Long Guide rod (platen unit)
37. Base box structure (housing)
38. Base box support shelf
39. Platen support shelf
40. Removable door
41. Camera return spring (platen door)
42. Platen housing
43. Drive motor (platen scan)
44. Timing belt (platen scan)
45. Magnet—Camera coupling
46. Platen—Protrusion, timing belt support
47. Striker plate (camera)
48. Clear window/aperture (platen scan)
49. Platen lid/Cover
50. Platen alignment pins
51. Platen electrical connector
52. Platen latch hooks
53. Platen latch return springs
54. Base box cam profile
55. Camera lock
57. Interlock switch
58. Contact array imager
59. Structural support frame (upper paper path)
60. Latch release levers
62. Sharp bend in paper path
64. Pivot

What is claimed is:

1. A combination platen and sheet fed scanner having a retractable lamp comprising:
    a sheet fed scanning unit;
    a sheet feeding mechanism in said sheet fed scanning unit;
    a first camera which images a first side of a document fed through said sheet feeding mechanism;
    a second camera which images a second side of said document;
    a platen detachably mounted to said sheet fed scanning unit;
    a mechanism for moving said second camera from said sheet fed scanning unit into said platen;
    a lamp associated with said second camera wherein said lamp is retractably mounted to said second camera.

2. The combination platen and sheet fed scanner as in claim 1, wherein a paper path between a set of rollers, mounted in said sheet fed scanning unit and adjacent to an aperture for said second camera, is approximately straight.

3. The combination platen and sheet fed scanner as in claim 1, wherein said lamp is pivotally mounted to said second camera.

4. The combination platen and sheet fed scanner as in claim 3, wherein an arm attached to said lamp is moved by a combination of a cam and a cam follower.

5. The combination platen and sheet fed scanner as in claim 3, wherein said lamp is spring loaded to said second camera.

6. A method of platen scanning and sheet fed scanning comprising:
    feeding a document between a first camera and a second camera in a sheet fed scanning unit;
    moving said second camera to a platen detachably mounted to said sheet fed scanning unit; and
    retracting a lamp mounted to said second camera as it is moved from said sheet fed scanning unit to said platen.

7. The method of claim 6, wherein a paper path between a set of rollers adjacent to an aperture for said second camera is approximately straight.

8. The method of claim 6, wherein said lamp is pivotally mounted to said second camera.

9. The method of claim 8, wherein an arm attached to said lamp is moved by a combination of a cam and a cam follower.

10. The method of claim 8, wherein said lamp source is spring loaded to said second camera.

11. The method of claim 6, wherein said second camera images a second side of said document.

12. A combination platen and sheet fed scanner having a retractable lamp comprising:
    a sheet fed scanning unit;
    a means for feeding a document in said sheet fed scanning unit;
    a first means for imaging a first side of a document fed through said sheet fed scanning unit;
    a second means for imaging a second side of said document;
    a platen detachably mounted to said sheet fed scanning unit;
    a means for moving said second means for imaging from said sheet fed scanning unit into said platen; and
    an illumination means retractably mounted to second means for imaging.

13. The combination platen and sheet fed scanner as in claim 12, wherein a paper path between a set of rollers, mounted in said sheet fed scanning unit and adjacent to an aperture for said second means for imaging, is approximately straight.

14. The combination platen and sheet fed scanner as in claim 12, wherein said illumination means is pivotally mounted to said second means for imaging.

15. The combination platen and sheet fed scanner as in claim 14, wherein an arm attached to said illumination means is moved by a combination of a cam and a cam follower.

16. The combination platen and sheet fed scanner as in claim 14, wherein said illumination means is spring loaded to said second means for imaging.

17. A combination platen and sheet fed scanner comprising:
    a sheet fed scanning unit;
    a first transport in said sheet scanning unit for feeding a document;
    a first imager for imaging a first side of said document;
    a second imager comprising a contact array for imaging a second side of said document;

a platen detachably mounted to said sheet fed scanning unit;

a second transport for moving said second imager from said sheet fed scanning unit into said platen; and wherein said second imager is retractably mounted on said second transport.

18. The combination platen and sheet fed scanner as in claim 17, wherein a paper path between a set of rollers, mounted in said sheet fed scanning unit and adjacent to an aperture for said second imager is approximately straight.

19. The combination platen and sheet fed scanner as in claim 17, wherein said second imager is pivotally mounted.

20. The combination platen and sheet fed scanner as in claim 19, wherein an arm attached to said second imager is moved by a combination of a cam and a cam follower.

21. The combination platen and sheet fed scanner as in claim 19, wherein said second imager is spring loaded.

* * * * *

UNITED STATES PATENT AND TRADEMARK OFFICE
CERTIFICATE OF CORRECTION

PATENT NO. : 7,130,088 B2 Page 1 of 1
APPLICATION NO. : 10/136502
DATED : October 31, 2006
INVENTOR(S) : Robert S. Breslawski et al.

It is certified that error appears in the above-identified patent and that said Letters Patent is hereby corrected as shown below:

On the title page item (73), (Assignee) before "Kodak" insert --Eastman--

Signed and Sealed this

Third Day of April, 2007

JON W. DUDAS
*Director of the United States Patent and Trademark Office*